United States Patent
Akahane et al.

(10) Patent No.: US 9,019,842 B2
(45) Date of Patent: Apr. 28, 2015

(54) RELAY DEVICE, NETWORK SYSTEM, AND NETWORK FAILURE DETECTION METHOD

(75) Inventors: Shinich Akahane, Hachioji (JP); Teruo Kaganoi, Yokohama (JP)

(73) Assignee: Alaxala Networks Corporation, Kawasaki (JP)

( * ) Notice: Subject to any disclaimer, the term of this patent is extended or adjusted under 35 U.S.C. 154(b) by 503 days.

(21) Appl. No.: 13/403,461

(22) Filed: Feb. 23, 2012

(65) Prior Publication Data

US 2012/0263044 A1    Oct. 18, 2012

(30) Foreign Application Priority Data

Apr. 18, 2011   (JP) .................................. 2011-091860

(51) Int. Cl.
*H04L 12/703*   (2013.01)
*H04L 12/26*   (2006.01)

(52) U.S. Cl.
CPC ..................................... *H04L 43/10* (2013.01)

(58) Field of Classification Search
USPC ......... 370/216, 226, 229, 231, 241, 242, 243, 370/244, 247, 248, 249, 250
See application file for complete search history.

(56) References Cited

U.S. PATENT DOCUMENTS

| 6,154,448 | A | * | 11/2000 | Petersen et al. | ............... | 370/248 |
| 2006/0045021 | A1 | * | 3/2006 | Deragon et al. | ............... | 370/249 |
| 2009/0141641 | A1 | * | 6/2009 | Akahane et al. | ............... | 370/242 |

FOREIGN PATENT DOCUMENTS

| JP | 2000-315165 | A | 11/2000 |
| JP | 2003-338831 | A | 11/2003 |
| JP | 2009-135625 | A | 6/2009 |

OTHER PUBLICATIONS

Foschiano, M.; Cisco Systems UniDirectional Link Detection (UDLD) Protocol; Network Working Group, Request for Comments: 5171; Apr. 2008.

* cited by examiner

*Primary Examiner* — Curtis A Alia

(74) *Attorney, Agent, or Firm* — William T. Ellis

(57) ABSTRACT

A relay device comprises: a packet type determining unit that determines: whether a received packet is a monitoring packet, sent by a first communication device that monitors a network connection state, set the first communication device as the sending source, and set a second communication device that is monitored as the sending destination; and whether the received packet is a monitoring response packet sent as the response to the monitoring packet with sending source address and destination address of monitoring packet interchanged; a transfer processing unit that receives the monitoring packet and transfers it to a destination; a monitoring unit that monitors receipt of the monitoring response packet within a specified period; and a failure notification packet sending unit that generates a failure notification packet and sends it to a specified destination, when the monitoring response packet is not received within the specified period.

9 Claims, 22 Drawing Sheets

WHEN THE NETWORK CONNECTION STATUS IS NORMAL

WHEN A FAILURE OCCURS

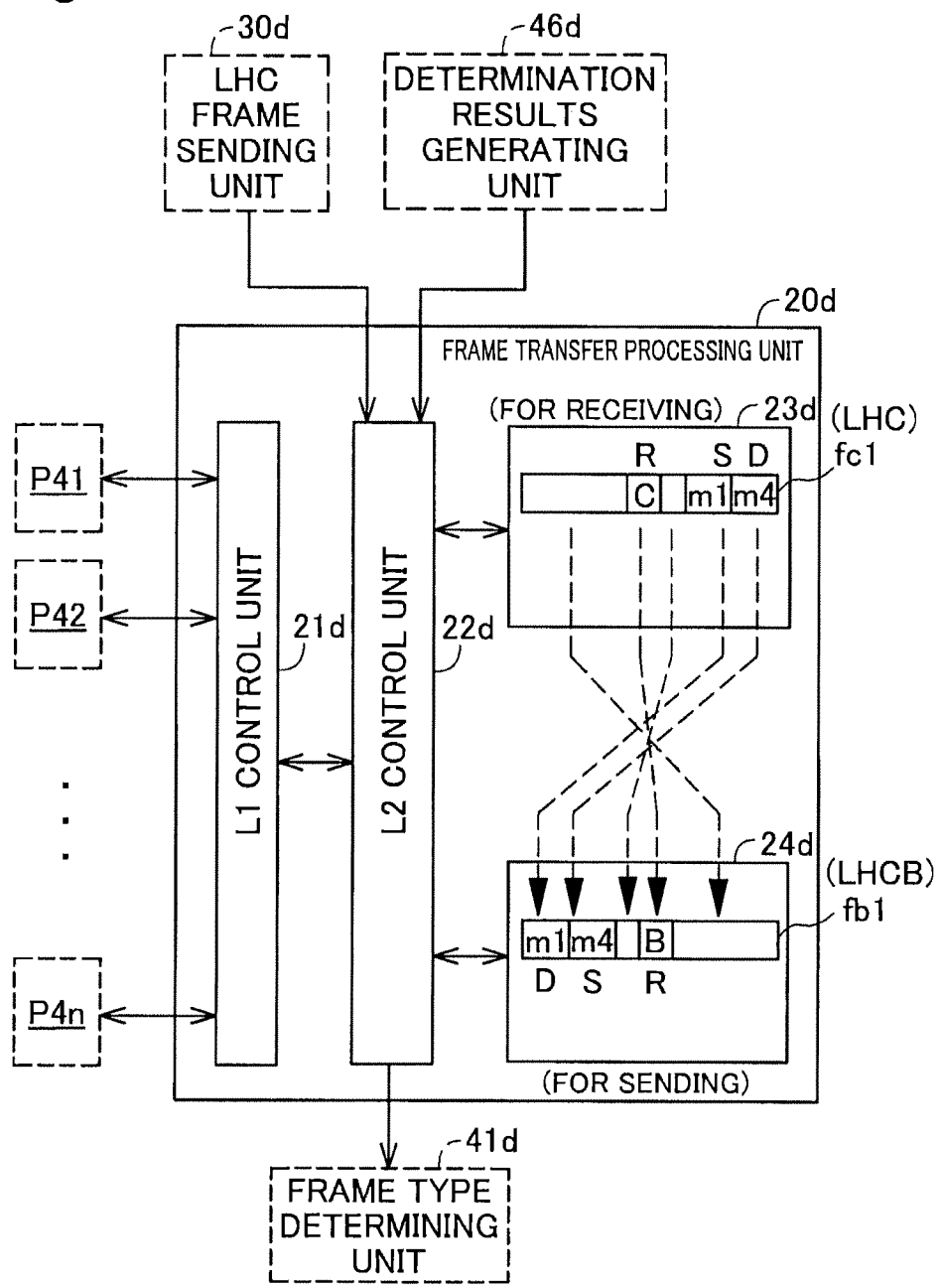

Fig.5

(WINDOW FOR MONITORING SETTINGS) W1

| MONITORING SETTINGS | |
|---|---|
| MONITORING SUBJECT SWITCH: | FOURTH SWITCH |
| MONITORING SUBJECT PORT: | FIRST PORT |
| FRAME SENDING INTERVAL: | 1 (ms) |
| FRAME MONITORING TIME: | 10 (ms) |

B1
[ O K ] [ CANCEL ]

Fig.6

(WINDOW FOR SETTING MONITORING FRAME ANSWER) W2

MONITORING FRAME ANSWER SETTING

ANSWER SUBJECT PORT: FIRST PORT

B3
[ O K ] [ CANCEL ]

LHC (LHCB) FRAME FORMAT

PORT STATUS MANAGEMENT TABLE
(SET PORT P11 AS THE MONITORING SUBJECT PORT)

| PORT | LOGIC STATUS | MONITORING STATUS | MONITORING TIME | MONITORING TIMER |
|---|---|---|---|---|
| P11 | BLK | RECOVERY MONITORING | 10ms | 0ms |
| P12 | FWD | FAILURE MONITORING | 50ms | 1ms |
| ⋮ | ⋮ | ⋮ | ⋮ | ⋮ |
| P1n | FWD | FAILURE MONITORING | 100ms | 2ms |

PORT STATUS MANAGEMENT TABLE (WHEN FAILURE OCCURS)

| PORT | LOGIC STATUS | MONITORING STATUS | MONITORING TIME | MONITORING TIMER |
|---|---|---|---|---|
| P11 | BLK | RECOVERY MONITORING | 10ms | 10ms |
| P12 | FWD | FAILURE MONITORING | 50ms | 1ms |
| ⋮ | ⋮ | ⋮ | ⋮ | ⋮ |
| P1n | FWD | FAILURE MONITORING | 100ms | 2ms |

Fig.24

| MONITORING ACTOR MAC | MONITORING SUBJECT MAC | MONITORING TIME | MONITORING TIMER |
|---|---|---|---|
| m1 | m4 | 8msec | 7msec |
| m1 | m6 | 8msec | 2msec |
| m5 | m4 | 8msec | 1msec |
| m6 | m4 | 8msec | 0msec |
| ... | ... | ... | ... |

49

RELAY DEVICE, NETWORK SYSTEM, AND NETWORK FAILURE DETECTION METHOD

CROSS REFERENCE TO RELATED APPLICATIONS

This application claims the priority based on Japanese Patent Application No. 2011-091860 filed on Apr. 18, 2011, the disclosures of which are hereby incorporated by reference in their entireties.

BACKGROUND

1. Technical Field

The present invention relates to technology for detecting failure on a network.

2. Description of the Related Art

When two communication devices (layer 2 switches, for example) are mutually connected via a network, two paths (communication paths) are established in both directions between the two communication devices. When a failure occurs with one path (called a "unidirectional path failure"), various problems occur on the network such as looping of the frame. Therefore, in order to detect unidirectional path failure, a UDLD (Uni-Directional Link Detection) protocol is proposed.

With UDLD, each communication device sends a link health-check packet to the other communication device, and detects whether a unidirectional link failure occurs based on whether a link health-check packet sent from the other communication device is received.

With UDLD, analysis of various parameters included in the received packet is performed using software, and detection of whether the unidirectional path failure occurs is performed based on those analysis results. Therefore, there is a problem that long time is required until failure detection. Accordingly, shortening of the unidirectional path failure detection time is desired.

Taking into consideration at least part of the problems described above, the problem the present invention attempts to address is to detect unidirectional path failure between communication devices in a short time.

SUMMARY

In order to achieve at least part of the problems described above, the present invention provides various aspects and embodiments described below.

According to the first aspect of the present invention, provided is a relay device for performing relaying of packets with layer 2 or layer 3, the relay device comprising:

a packet type determining unit that determines: (i) whether the packet received by the relay device is a monitoring packet sent by a first communication device, the monitoring packet including the first communication device as a sending source and a second communication device as a sending destination, the first communication device monitoring a network connection state, the second communication device being monitored; and (ii) whether the packet received by the relay device is a monitoring response packet sent by the second communication device as the response to the monitoring packet when the second communication device receives the monitoring packet, the monitoring response packet being generated by interchanging a sending source address and a destination address of the monitoring packet;

a transfer processing unit that receives the monitoring packet and transfers the received monitoring packet to a destination of the monitoring packet;

a monitoring unit that monitors receiving of the monitoring response packet corresponding to the transferred monitoring packet within a specified period; and a failure notification packet sending unit that generates a failure notification packet notifying an occurrence of a communication failure and sends the failure notification packet to a specified destination, when the monitoring response packet is not received within the specified period.

According to the relay device of this constitution, utilizing the monitoring packet and the monitoring response packet sent and received between the first communication device and the second communication device, it is possible to quickly give notification to a specified destination of a unidirectional path failure that occurs between the relay device and the second communication device. For example, if a communication device other than the first communication device and the second communication device is set as the specified destination, it is possible to detect unidirectional path failure that occurs between the relay device and the second communication device in a short time at the communication device as well. In this application, "packet" means data transfer unit including a frame handled by layer 2 and a narrow meaning of packet handled by layer 3.

According to the second aspect of the present invention, provided is a relay device according to the first aspect, further comprising a learning unit that learns the specified destination to which the failure notification packet is sent, based on at least the sending source address included in the received monitoring packet.

The sending source address included in the monitoring packet means an actor of monitoring in a network connection state. According to the relay device of the second aspect, it is possible to automatically learn the monitoring actor as the failure notification packet destination. As a result, user convenience is improved.

According to a third aspect of the present invention, provided is a relay device according to the second aspect, wherein the learning unit records a correlation of the sending source address and the destination address which are included in the monitoring packet for each of the received monitoring packets, and learns as the specified destination the sending source address corresponding to the destination address of the monitoring packet for which the corresponding monitoring response packet is not received within the specified time, based on the recorded correlations.

The destination address included in the monitoring packet means a subject of the monitoring network connection state. According to the relay device of the third aspect, it is possible to send the failure notification packet only to the monitoring actor which monitors the communication device forming the path at which the failure occurs. Therefore, processing is efficient, and it is also possible to suppress the network load relating to failure notification.

According to a fourth aspect of the present invention, provided is a relay device according to the second aspect, wherein the learning unit learns the sending source address included in each of the received monitoring packets as the specified destination.

According to a relay device of this constitution, the specified destination is learned based on only the sending source address, so the constitution is simple. Also, all the monitoring actors are able to quickly detect failure.

According to a fifth aspect of the present invention, provided is a relay device according to any of the first through fourth aspects, wherein the failure notification packet sending unit sends the failure notification packet including the destination address of the monitoring packet for which the corresponding monitoring response packet is not received within the specified period.

The destination address of the monitoring packet for which the monitoring response packet is not received within the specified time means the communication device which forms the path on which a failure occurs. According to the relay device of the fifth aspect, it is possible to easily give notification of which path the failure occurs on. As a result, the communication device which receives the failure notification packet is able to easily detect the path on which the failure occurs.

According to a sixth aspect of the present invention, provided is a relay device according to the fifth aspect, wherein the failure notification packet sending unit includes in a payload of the failure notification packet the destination address of the monitoring packet for which the corresponding monitoring response packet is not received within the specified period.

According to a relay device of this constitution, it is possible to suitably give notification of which path a failure occurs on. For example, a communication device other than the first communication device and the second communication device can suitably detect the path on which a failure occurs.

According to a seventh aspect of the present invention, provided is a relay device according to the fifth aspect, wherein the failure notification packet sending unit sends as the failure notification packet a packet with a specified identifier, the packet including as the sending source address the destination address of the monitoring packet for which the corresponding monitoring response packet is not received within the specified period.

According to a relay device of this constitution, it is possible to give notification of on which path a failure occurs based on only the header information of the failure notification packet. As a result, the communication device which received the failure notification packet can accelerate the detection of the path on which the failure occurs.

According to an eighth aspect of the present invention, provided is a relay device according to any of the first through seventh aspects, wherein when the relay path information from the first communication device to the second communication device is given to the received monitoring packet, the failure notification packet sending unit sends the failure notification packet including the relay path information given to the monitoring packet for which the corresponding monitoring response packet is not received within the specified period.

According to a relay device of this constitution, it is possible to give notification of on which path a failure occurs based on the relay path information. As a result, the communication device which received the failure notification packet is able to easily detect the path on which the failure occurs.

According to a ninth aspect of the present invention, provided is a relay device according to any of the first through eighth aspects, wherein the packet type determining unit performs determination based on the identifier given to the packet received by the relay device.

According to a relay device of this constitution, it is possible to easily determine the monitoring packet and the monitoring response packet.

According to a tenth aspect of the present invention, provided is a relay device according to any of the first through ninth aspects, wherein when at least one of the sending source address and the destination address which are included in the packet received by the relay device is a specified address, the packet type determining unit determines that the received packet is the monitoring packet, or that the received packet is the monitoring response packet.

According to a relay device of this constitution, it is possible to easily determine the monitoring packet and the monitoring response packet.

The invention is not limited to the aspect of the relay device described above but may be actualized by various other aspects, for example, a network system as a eleventh aspect described below, a network failure detection method as a twelfth aspect described below, a program performed by a relay device, a non-transitory computer-readable storage medium in which the program is recorded, and the like.

According to the eleventh aspect of the present invention, provided is a network system comprising: a first communication device that monitors a network connection state; a second communication device that is monitored; and a relay device provided on a communication path between the first communication device and the second communication device, the first communication device comprising a monitoring packet sending unit that sends a monitoring packet via the relay device, the monitoring packet including the first communication device as a sending source, and the second communication device as a destination, the second communication device comprising a monitoring response packet sending unit that receives the monitoring packet via the relay device, and sends a monitoring response packet as a response to the received monitoring packet via the relay device, the monitoring response packet being generated by interchanging a sending source address and a destination address of the monitoring packet and including the first communication device as a destination, the relay device comprising:

a packet type determining unit that determines (i) whether the packet received by the relay device is the monitoring packet and (ii) whether the received packet is the monitoring response packet;

a transfer processing unit that receives the monitoring packet and transfers the received monitoring packet to a destination of the monitoring packet;

a monitoring unit that monitors receiving of the monitoring response packet corresponding to the transferred monitoring packet within a specified period; and a failure notification packet sending unit that generates a failure notification packet for notifying an occurrence of a communication failure and sends the failure notification packet to a specified destination when the monitoring response packet is not received within the specified period.

According to the twelfth aspect of the present invention, provided is a network failure detection method in a network system including: a first communication device that monitors a network connection state; a second communication device that is monitored; and a relay device provided on a communication path between the first communication device and the second communication device, the method detecting a failure of a network connected between the first communication device and the second communication device, the method comprising:

a step of the first communication device sending a monitoring packet via the relay device, the monitoring packet including the first communication device as a sending source, and the second communication device as a destination;

a step of the relay device receiving the monitoring packet and transferring the received monitoring packet to the second communication device;

a step of the relay device monitoring a receipt of a monitoring response packet within a specified period, the monitoring response packet being sent as the response to the monitoring packet, the monitoring response packet being generated by interchanging a sending source address and a destination address of the monitoring packet when the second communication device receives the monitoring packet;

a step of the relay device generating a failure notification packet notifying an occurrence of a communication failure and sending the generated failure notification packet to a specified destination, when the monitoring response packet is not received within the specified period; and a step of a communication device as the specified destination receiving the failure notification packet and detecting the occurrence of the communication failure.

BRIEF DESCRIPTION OF THE DRAWINGS

FIG. 4 is an explanatory drawing showing the constitution of a frame transfer processing unit 20d of the fourth switch SW4;

FIG. 5 is an explanatory drawing showing a setting window W1 for performing path failure monitoring;

FIG. 6 is an explanatory drawing showing a setting window W2 for performing path failure monitoring;

FIG. 24 is an explanatory drawing showing a specific example of the monitoring list table 49;

DESCRIPTION OF THE EMBODIMENTS

Figure 1:
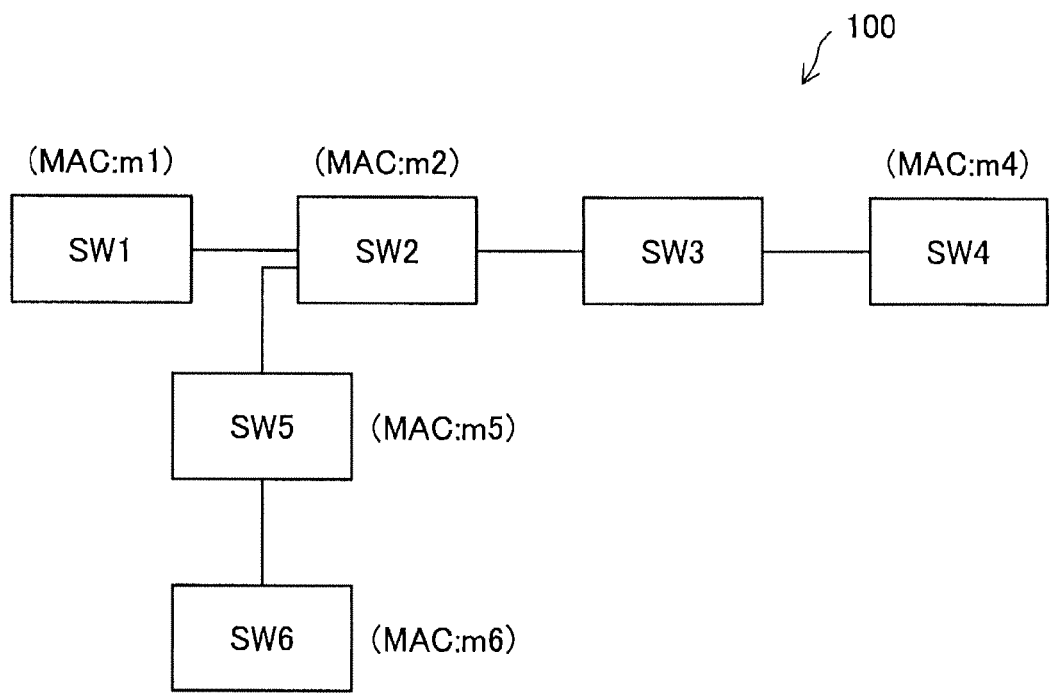
FIG. 1 is an explanatory drawing showing the schematic structure of a network system 100 constituted using a second switch SW2 as an embodiment of the relay device of the present invention.

A. Embodiment
A-1. System Configuration:

FIG. 1 shows the schematic structure of a network system 100 constituted using a second switch SW2 as an embodiment of the relay device of the present invention. As shown in the drawing, the network system 100 includes six switches or first switch SW1 through sixth switch. In this embodiment, each of the switches SW1 through SW6 is a layer 2 switch for relaying frames with layer 2, more specifically, a second layer (data link layer) of the OSI reference model. Each of the switches SW1 through SW6 includes a plurality of ports (not illustrated), and relays frames received from terminals (personal computer, server or the like) connected to the ports.

According to this embodiment, an Ethernet frame ("Ethernet" is a registered trademark) is used as a frame relayed in the network system 100. However, instead of the Ethernet frame, it is also possible to use any frame (packet, cell) prescribed by a layer 2 protocol such as FDDI (Fiber Distributed Data Interface), ATM (Asynchronous Transfer Mode) or the like. For the first switch SW1, MAC (Media Access Control) address "m1" is set in advance as the layer 2 address. Similarly, for switches SW2 and SW4 to SW6, MAC addresses "m2" and "m4" through "m6" are set in advance as the layer 2 addresses. These MAC addresses "m2" and "m4" through "m6" are dedicated MAC addresses assigned for path failure monitoring.

As shown in FIG. 1, in the network system 100, the first switch SW1 through fourth switch SW4 are arranged in series. Also, the second switch SW2 is connected to the fifth switch SW5 and the sixth switch SW6 in series, which are in parallel to the first switch SW1.

Figure 2A:
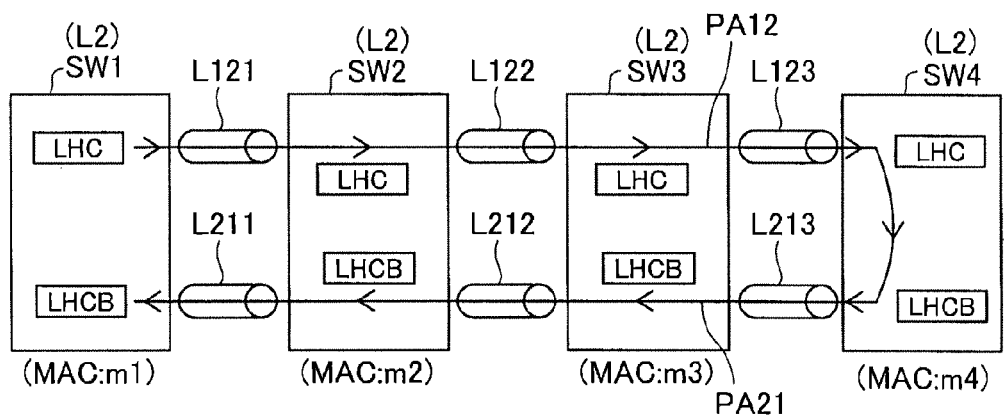
FIG. 2A and FIG. 2B are explanatory drawings showing the path between a first switch SW1 through a fourth switch SW4.
Figure 2B:
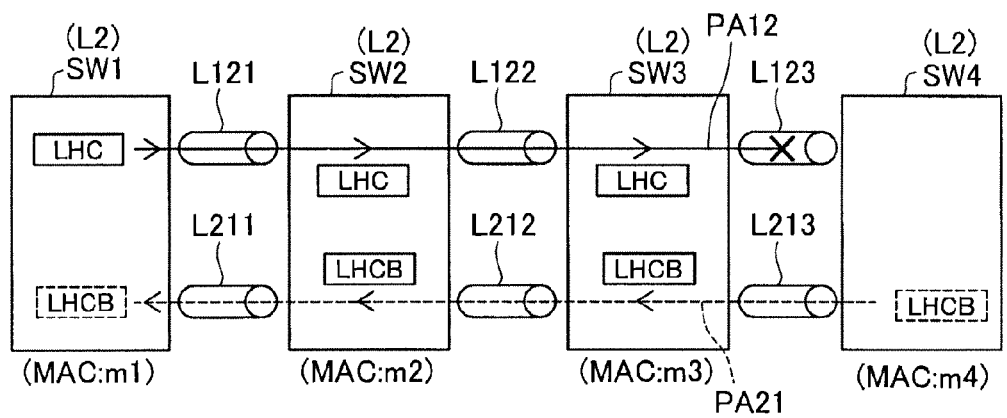

According to this embodiment, the switches SW1 and SW4 to SW6 have the function of reciprocally monitoring the network connection status. This connection status monitoring mechanism is described below with the first switch SW1 as the monitoring actor and the fourth switch SW4 as the monitoring subject. FIG. 2A and FIG. 2B show the path between the first switch SW1 and the fourth switch SW4. FIG. 2A shows the state when the path between the first switch SW1 and the fourth switch SW4 is normal, and FIG. 2B shows the state when a failure occurs in the path between the first switch SW1 and the fourth switch SW4.

The first switch SW1 and the second switch SW2 are mutually connected by two physical links L121 and L211. Similarly, the second switch SW2 and the third switch SW3 are connected by physical links L122 and L212, and the third switch SW3 and the fourth switch SW4 are connected by physical links L123 and L213. With this constitution, as the path from the first switch SW1 to the fourth switch SW4, the path PA12 is formed for which frames are relayed in the sequence of the first switch SW1, the physical link L121, the second switch SW2, the physical link L122, the third switch SW3, the physical link L123, and the fourth switch SW4. Also, as the path from the fourth switch SW4 to the first switch SW1, the path PA21 is formed for which frames are relayed in the sequence of the fourth switch SW4, the physical link L213, the third switch SW3, the physical link L212, the second switch SW2, the physical link L211, and the first switch SW1.

In the network system 100, in order to monitor the existence of the occurrence of failure on either of the two paths PA12 and PA21, the first switch SW1 sends a frame for monitoring (hereafter referred to as an "LHC frame"). As shown in FIG. 2A, when failure does not occur on the two paths PA12 and PA21, the LHC frame sent from the first switch SW1 is relayed to the forth switch SW4 through the path PA12. When the forth switch SW4 receives the LHC frame, the fourth switch SW4 sends a frame for monitoring response (hereafter referred to as an "LHCB frame"). As is described later, the LHCB frame is a frame that responds to the LHC frame, and the fourth switch SW4 generates the LHCB frame by hardware processing. The LHCB frame sent from the fourth switch SW4 is relayed to the first switch SW1 through the path PA21. The first switch SW1 monitors whether or not the LHCB frame is received and judges that both paths PA12 and PA21 are normal when the LHCB frame is received within a specified period.

On the other hand, as shown in FIG. 2B, for example when failure (unidirectional path failure) occurs at the physical link L123, the LHC frame is not relayed to the fourth switch SW4. In this case, the fourth switch SW4 does not send the LHCB frame, so the first switch SW1 does not receive the LHCB frame within the specified period, and judges that a failure has occurred at least on one of the two paths PA12 and PA21.

To actualize this kind of unidirectional path failure monitoring, in addition to the relay processing of the frame sent from the terminal (not illustrated), the first switch SW1 and the fourth switch SW4 execute the process of sending and receiving the LHC frames, sending and receiving the LHCB frames, and the like. In this case, the first switch SW1 corresponds to the first communication device in the claims, and the fourth switch SW4 corresponds to the second communication device in the claims.

The second switch SW2 monitors transmission of the LHC frames and the LHCB frames between the first switch SW1 and the fourth switch SW4, and, when an unidirectional path failure occurs, notifies a switch other than the first switch SW1, for example the fifth switch SW5 and the sixth switch SW6. In the explanation below, first, details of the first switch SW1 and the fourth switch SW4 are described, and next, details of the second switch SW2 are described. The third switch SW3 is a general purpose layer 2 switch. Specifically, the third switch SW3 relays received frames, based on the destination MAC address set in the frame and in accordance with the destination table (relay table for which MAC addresses and output ports are correlated) (not illustrated).

Figure 3A:
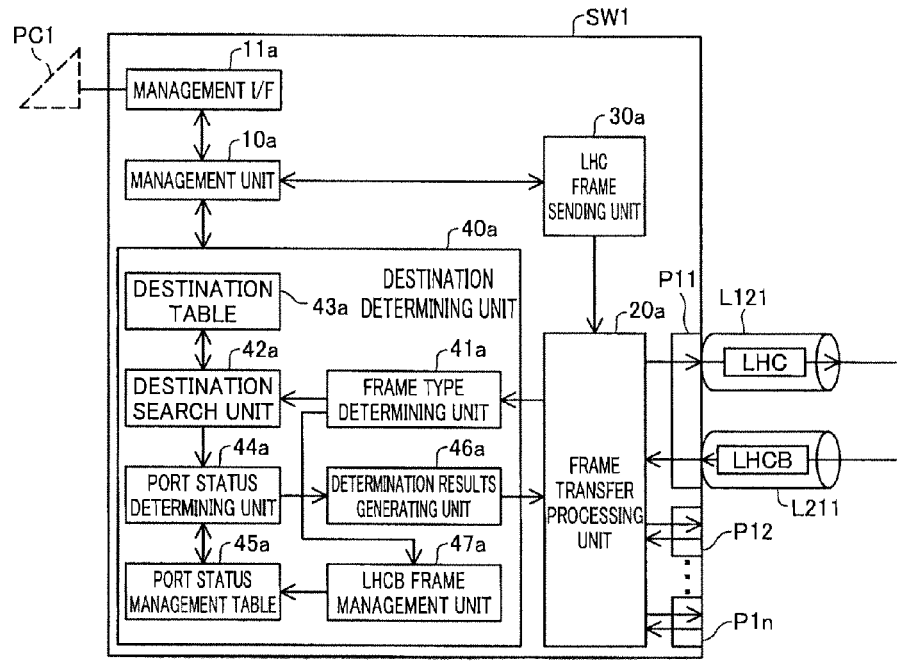
FIG. 3A and FIG. 3B are explanatory drawings showing the constitution of the first switch SW1 and the fourth switch SW4.
Figure 3B:
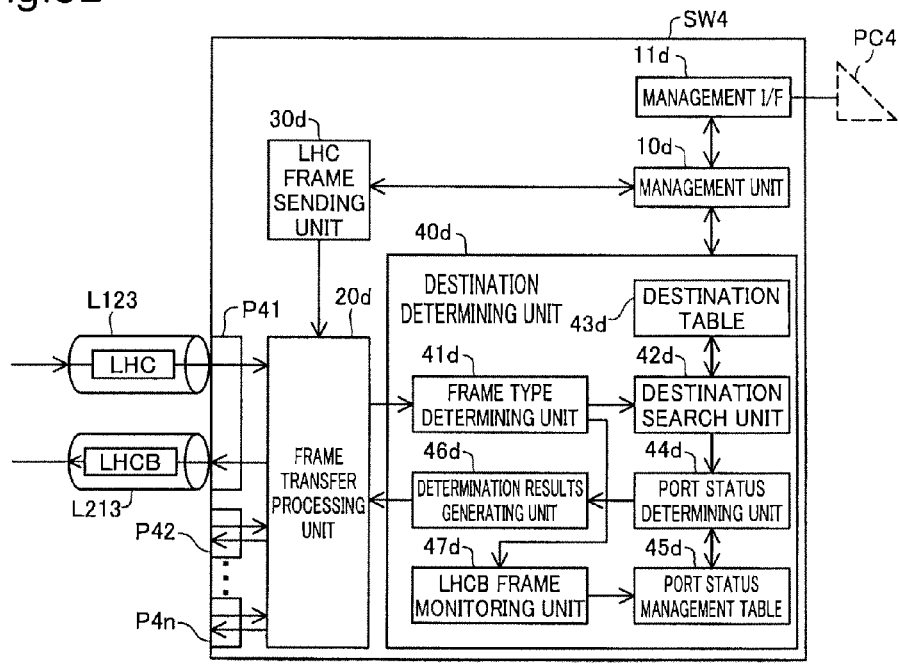

A-2. Details of First Switch SW1 and Fourth Switch SW4:

A-2-1. Constitution of First Switch SW1 and Fourth Switch SW4:

FIG. 3A and FIG. 3B show the detailed constitution of the first switch SW1 and the fourth switch SW4. The first switch SW1 and the fourth switch SW4 have the same constitution. In FIG. 3A and FIG. 3B, in order to differentiate the same constitutional elements of the first switch SW1 and the fourth switch SW4, the code "a" is given to each constitutional element of the first switch SW1, and the code "b" is given to each element of the fourth switch SW4. As a representative of the first switch SW1 and the fourth switch SW4, the constitution of the fourth switch SW4 is described below. The fourth switch SW4 includes a plurality of ports P41, P42, ..., P4n (n is an integer of 2 or greater), a frame transfer processing unit 20d, a destination determining unit 40d, an LHC frame sending unit 30d, a management unit 10d, and a management interface 11d.

The plurality of ports P41, P42, ..., P4n respectively terminate the sending side physical link and the receiving side physical link. For example, as shown in FIG. 3B, the port P41 terminates the sending side physical link L123, and the receiving side physical link L213.

FIG. 4 shows the detailed constitution of the frame transfer processing unit 20d shown in FIG. 3B. The frame transfer processing unit 20d includes a layer 1 control unit 21d, a layer 2 control unit 22d, a received frame buffer 23d, and a sent frame buffer 24d. Each functional unit is constituted by a storage element and a circuit such as ASIC (Application Specific Integrated Circuit) or the like, and is capable of performing hardware processing.

The layer 1 control unit 21d is a functional unit for performing processing of layer 1 (first layer of the OSI reference model (physical layer)), and is respectively connected with each port P41, P42, ..., P4n, and the layer 2 control unit 22d. The layer 1 control unit 21d generates layer 2 frames from the signals received at each port P41, P42, P4n and outputs these to the layer 2 control unit 22d, and generates signals based on the layer 2 frame received from the layer 2 control unit 22d and outputs these to each port P41, P42, ..., P4n.

The layer 2 control unit 22d is a functional unit for performing layer 2 processing, and is connected with the layer 1 control unit 21d, the received frame buffer 23d, and the sent frame buffer 24d. Also, the layer 2 control unit 22d is connected to the LHC frame sending unit 30d, a determination results generating unit 46d, and a frame type determining unit 41d described later. The layer 2 control unit 22d stores the frames received from the layer 1 control unit 21d in the received frame buffer 23d, and reads the frames from the received frame buffer 23d and sends the frames to another functional unit. In addition, the layer 2 control unit 22d generates frames and stores the frames in the sent frame buffer 24d, and reads frames from the sent frame buffer 24d and outputs the flames to the layer 1 control unit 21d in accordance with instructions received from the other functional units.

The received frame buffer 23d stores the frames received by the fourth switch SW4. In FIG. 4, a LHC frame fc1 is stored in the received frame buffer 23d. The sent frame buffer 24d stores frames which the fourth switch SW4 is going to send. In FIG. 4, a LHCB frame fb1 is stored in the sent frame buffer 24d.

Here, the description returns to FIG. 3B. The destination determining unit 40d includes the frame type determining unit 41d, a destination table 43d, a destination search unit 42d, a port status management table 45d, a port status determining unit 44d, the determination results generating unit 46d, and a LHCB frame monitoring unit 47d.

The frame type determining unit 41d determines the type of the received frame. The destination table 43d is a table that is referred when relaying frames, and is a table for which the identifier set for the frame such as the destination MAC address, VLAN-ID or the like and the frame output port are correlated. The destination search unit 42d refers the destination table 43d, and determines an output port for relaying the received frame. The port status management table 45d is a table for managing the logic status of each port. The port status determining unit 44d refers the port status management table 45d and determines the output port status. The determination results generating unit 46d notifies the frame transfer processing unit 20d of various types of instructions described later such as discard instructions or the like and the output port. The LHCB frame monitoring unit 47d monitors receiving of LHCB frames sent from switches as monitoring subject.

The management unit 10d is connected to the management interface 11d, the LHC frame sending unit 30d, and the destination determination 40d, and controls each constitutional element. The management interface 11d is a functional unit for providing an interface for connecting with the management terminal PC4 shown by the dotted line. As this interface, it is possible to use, for example, a USB (Universal Serial Bus) interface, a serial interface such as RS232C or the like, an IEEE 802.3u interface or the like. The LHC frame sending unit 30d gives instructions of generating the LHC frame to the frame transfer processing unit 20d in accordance with instructions received from the management unit 10d.

In the network system 100, it is possible to detect the occurrence of path failure in a short time by the first switch SW1 and the fourth switch SW4 executing the path failure monitoring start process, received frame processing, and the LHCB frame monitoring process described later.

The LHC frame described above corresponds to the monitoring packet in the claims. The LHCB frame corresponds to the monitoring response packet in the claims. Also, the LHC frame sending unit 30a and the frame transfer processing unit 20a correspond to the monitoring packet sending unit in the claims, and the frame transfer processing unit 20d corresponds to the monitoring response packet sending unit.

A-2-2. Path Failure Monitoring Start Process:

FIG. 5 shows a setting window W1 for performing path failure monitoring. FIG. 6 shows a setting window W2 for performing path failure monitoring. When monitoring the paths PA12 and PA21 shown in FIG. 2A, a user (a system administrator of the network system 100 or the like) performs specified settings with switches that terminate these paths PA12 and PA21, in other words, the monitoring actor and monitoring subject switches (the first switch SW1 and the fourth switch SW4).

In specific terms, the user connects the management terminal PC1 to the first switch SW1 as shown in FIG. 3A, causes the management terminal PC1 to display the monitoring setting window W1 shown in FIG. 5, and inputs the various parameters. As shown in FIG. 5, the monitoring setting window W1 includes fields for setting each parameter of the monitoring subject switch (switch at the other end side on the monitoring subject path), the monitoring subject port, the frame sending interval, and the frame monitoring time, and an OK button B1. In FIG. 5, "fourth switch SW4" is input as the monitoring subject switch, "first port (port P11)" is input as the monitoring subject port, "1 (ms)" is input as the frame sending interval, and "10 (ms)" is input as the frame monitoring time. The frame sending interval means the time interval from sending an LHC frame until sending the next LHC frame. The frame monitoring time is the time interval that is the criterion for judging whether or not path failure occurs, and when the first switch SW1 does not receive the next LHCB frame even after this frame monitoring time has been exceeded, the first switch judges that a path failure occurs. When the OK button B1 is pressed, each input parameter is stored in the memory (not illustrated) of the first switch SW1, and the path monitoring start instruction is sent to the first switch SW1 from the management terminal PC1.

Also, the user connects the management terminal PC4 to the fourth switch SW4 as shown in FIG. 3B, and causes the management terminal PC4 to display the monitoring frame answer setting window W2 shown in FIG. 6. As shown in FIG. 6, the setting window W2 includes a field for setting the answer subject port, and an OK button B3. The answer subject port means the subject port for executing the process of sending a monitoring response frame (LHCB frame) to the sending source of the LHC frame (frame answering process) when a monitoring frame (LHC frame) is received, and in FIG. 6, "first port (port P21)" is input. When the user inputs the answer subject port and presses the OK button B1, the input answer subject port is set for the fourth switch SW4.

Figure 7:
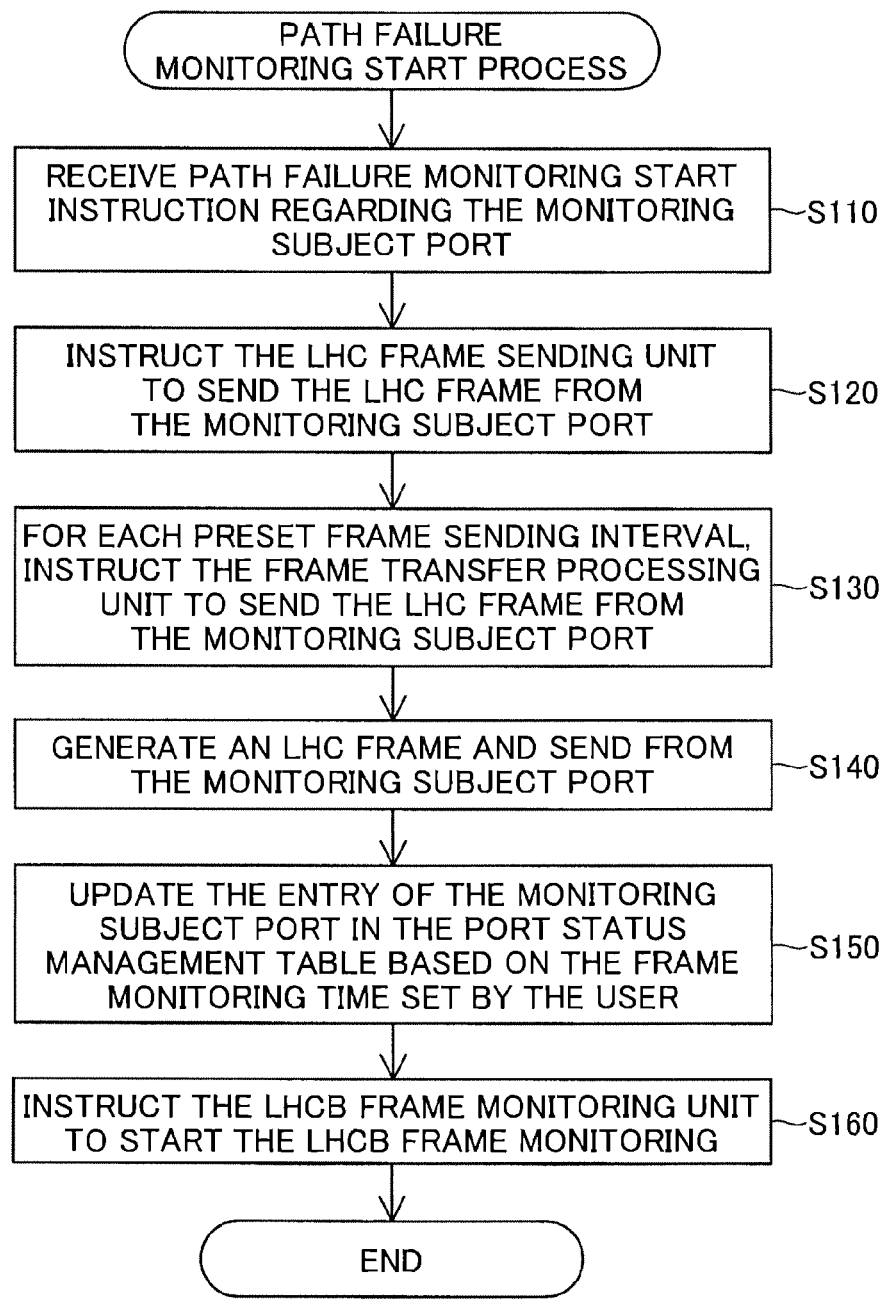
FIG. 7 is a flow chart showing the procedure of the path failure monitoring start process.

FIG. 7 is a flow chart showing the procedure of the path failure monitoring start process. The path failure monitoring start process shown in FIG. 7 is executed at the switch with which monitoring setting is performed by the user. As described previously, when monitoring setting is performed with the first switch SW1, the path failure monitoring start process is executed at the first switch SW1.

The management unit 10a of the first switch SW1 receives the path monitoring start instruction from the management terminal PC1 via the management interface 11a (step S110), and gives an instruction to the LHC frame sending unit 30a to send the LHC frame from the monitoring subject port (step S120).

The LHC frame sending unit 30a gives a instruction to the frame transfer processing unit 20a at each set frame sending interval to send the LHC frame from the set monitoring subject port to the set monitoring subject switch (step S130). The frame transfer processing unit 20a generates the LHC frame, and sends it from the monitoring subject port in accordance with the instruction received from the LHC frame sending unit 30a (step S140).

Figures 8, 9:
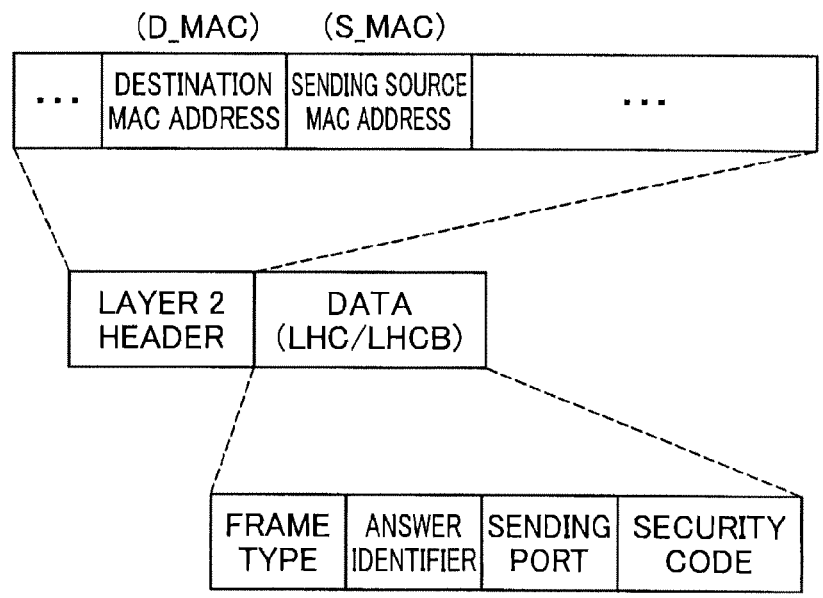
FIG. 8 is an explanatory drawing showing a frame format of the LHC frame and the LHCB frame.
FIG. 9 is an explanatory drawing showing an example of the initial status of a port status management table when the first switch SW1 port is set as the monitoring subject port.

FIG. 8 shows a frame format of the LHC frame and the LHCB frame. The LHC frame and the LHCB frame includes layer 2 header field and data field, similarly to a normal Ethernet frame. In the LHC frame and the LHCB frame, an dedicated MAC address assigned for monitoring is set in the destination MAC address field. Therefore, it is possible to distinguish between normal frames and other frames (LHC frames and LHCB frames) based on the destination MAC address. Also, an answer identifier field is provided in the data field of the LHC frames and the LHCB frames. Therefore, it is possible to distinguish between the LHC frames and the LHCB frames based on the answer identifier field. As shown in FIG. 5, when the fourth switch SW4 is set as the monitoring subject switch, the MAC address "m4" of the fourth switch SW4 which is the monitoring subject switch is set for the destination MAC address. The MAC address "m1" of the first switch SW1 is set for the LHC frame sending source MAC address. Also, a value indicating an LHC frame is set in the answer identifier field of the LHC frame.

The LHC frame sent from the first switch SW1 is relayed at the second switch SW2 and the third switch SW3 shown in FIG. 1 according to the destination table (relay table for which destination MAC addresses and output ports are correlated), and is sent to the fourth switch SW4.

As shown in FIG. 7, after sending the LHC frame, the management unit 10a of the first switch SW1 reads from memory (not illustrated) the frame monitoring time set by the user, and updates the monitoring subject port entries in the port status management table 45a based on the frame monitoring time (step S150).

FIG. 9 shows an example of an initial state of the port status management table 45a when the first switch port is set as the monitoring subject port.

As shown in FIG. 9, for each port, the logic status, monitoring status, monitoring time, and monitoring timer are set in the port status management table 45a. The logic status indicates status in regard with frame sending/receiving at each port. As the logic status, either one of (i) "frame send/receive enable (FWD)" indicating a state for which a path failure does not occur and (ii) "frame send/receive disable (BLK)" indicating a state for which path failure occurs can be set. The monitoring status indicates the status relating to monitoring of each port. As the monitoring status, either one of (i) "failure monitoring" indicating the state of monitoring path failure and (ii) "recovery monitoring" indicating the state of monitoring recovery after the occurrence of path failure can be set.

The monitoring time indicates the frame monitoring time set at step S150 in FIG. 7. The monitoring timer indicates the time elapsed after the previous sending of the LHC frame.

FIG. 9 shows the state of the port status management table 45a at the timing when path failure monitoring is being executed for ports P12 and P1n, and after the path failure monitoring start processing is executed and the entry is updated. In the initial state immediately after updating the port P11, the logic status "BLK", the monitoring status "recover monitoring", the monitoring time "10 ms", and the monitoring timer "0 ms" are set.

As shown in FIG. 7, when the monitoring subject port entry is updated at step S150 described previously, the monitoring unit 10a instructs the LHCB frame monitoring unit 47a to start the LHCB frame monitoring (step S160). At the LHCB frame monitoring unit 47a instructed to start LHCB frame monitoring, the LHCB frame monitoring process described later is executed.

A-2-3. Received Frame Processing:

FIG. 10 to FIG. 15 are flow charts showing the procedure of the received frame processing. This received frame processing is started at the timing when a frame arrives at any port after start-up at the first switch SW1 and the fourth switch SW4. In addition to the LHC frame and LHCB frame described previously, a normal frame is also sent and received between the first switch SW1 and the fourth switch SW4. Therefore, the received frame processing is started at the timing when any of these frames is received. For the LHC frame and normal frame, a case of receiving those frames at the fourth switch SW4 is described, and for the LHCB frame, a case of receiving the frame at the first switch SW1 is described below. The following description presupposes that the LHC frame is relayed via the path PA12, and the LHCB frame is relayed via the path PA21 as shown in FIG. 1.

Figure 10:
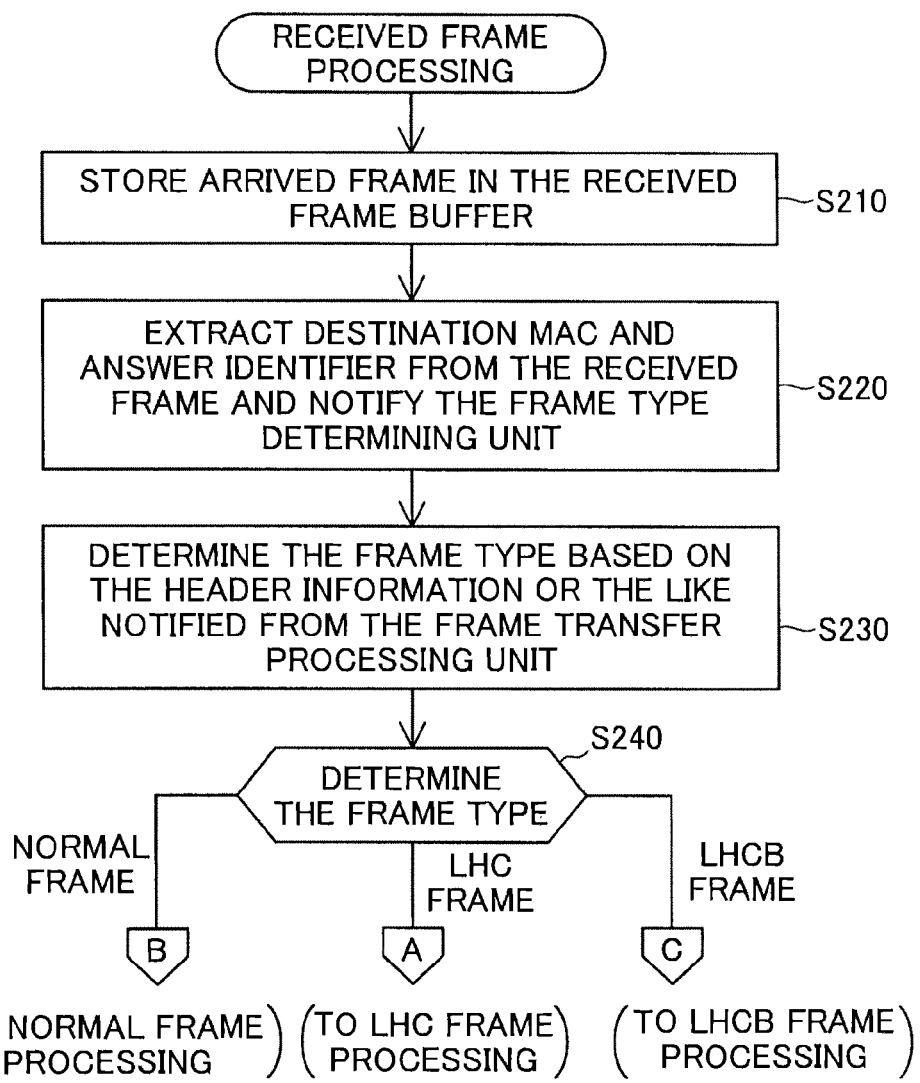
FIG. 10 to FIG. 15 are flow charts showing the received frame processing procedure.

A-2-3-1. LHC Frame Receiving:

As shown in FIG. 10, at the fourth switch SW4, the layer 2 control unit 22d stores received frames in the received frame buffer 23d (step S210). The layer 2 control unit 22d extracts the destination MAC address and the answer identifier from the received frame stored in the received frame buffer 23d, and notifies the frame type determining unit 41d of the extracted information (step S220).

The frame type determining unit 41d determines the frame type based on the destination MAC address and the answer identifier notified from the layer 2 control unit 22d (step S230). When the destination MAC address is a monitoring MAC address, and the answer identifier is a value indicating the LHC frame, the received frame is determined to be the LHC frame.

Figure 11:
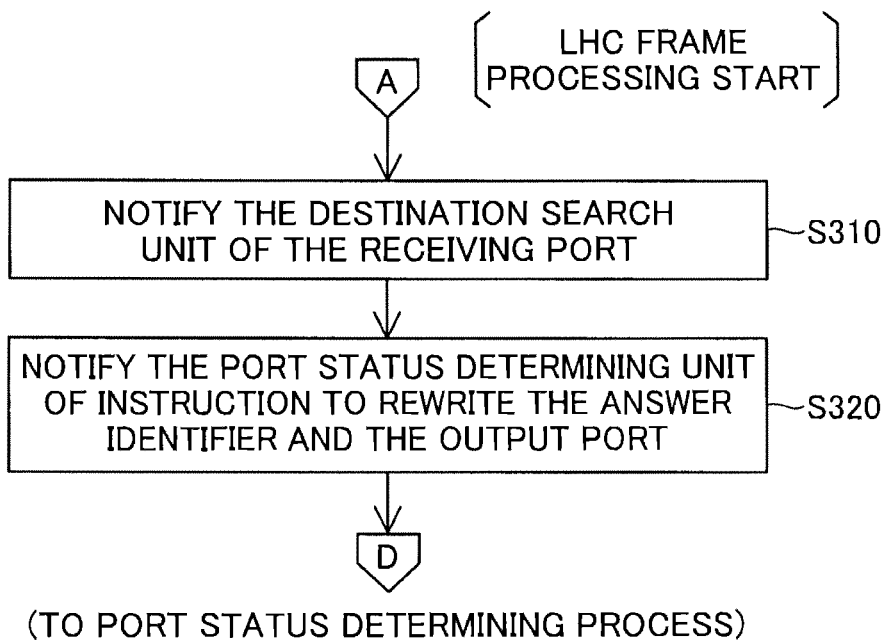

When determined to be the LHC frame, as shown in FIG. 11, the frame type determining unit 41d notifies the destination search unit 42d of the receiving port (step S310). The destination search unit 42d notifies the port status determining unit 44d of instruction of rewriting the answer identifier and of the output port (step S320). The output port notified at this step S320 means the output port of the LHCB frame described later, and is the same port as the receiving port notified from the destination search unit 42d at step S310.

Figure 12:
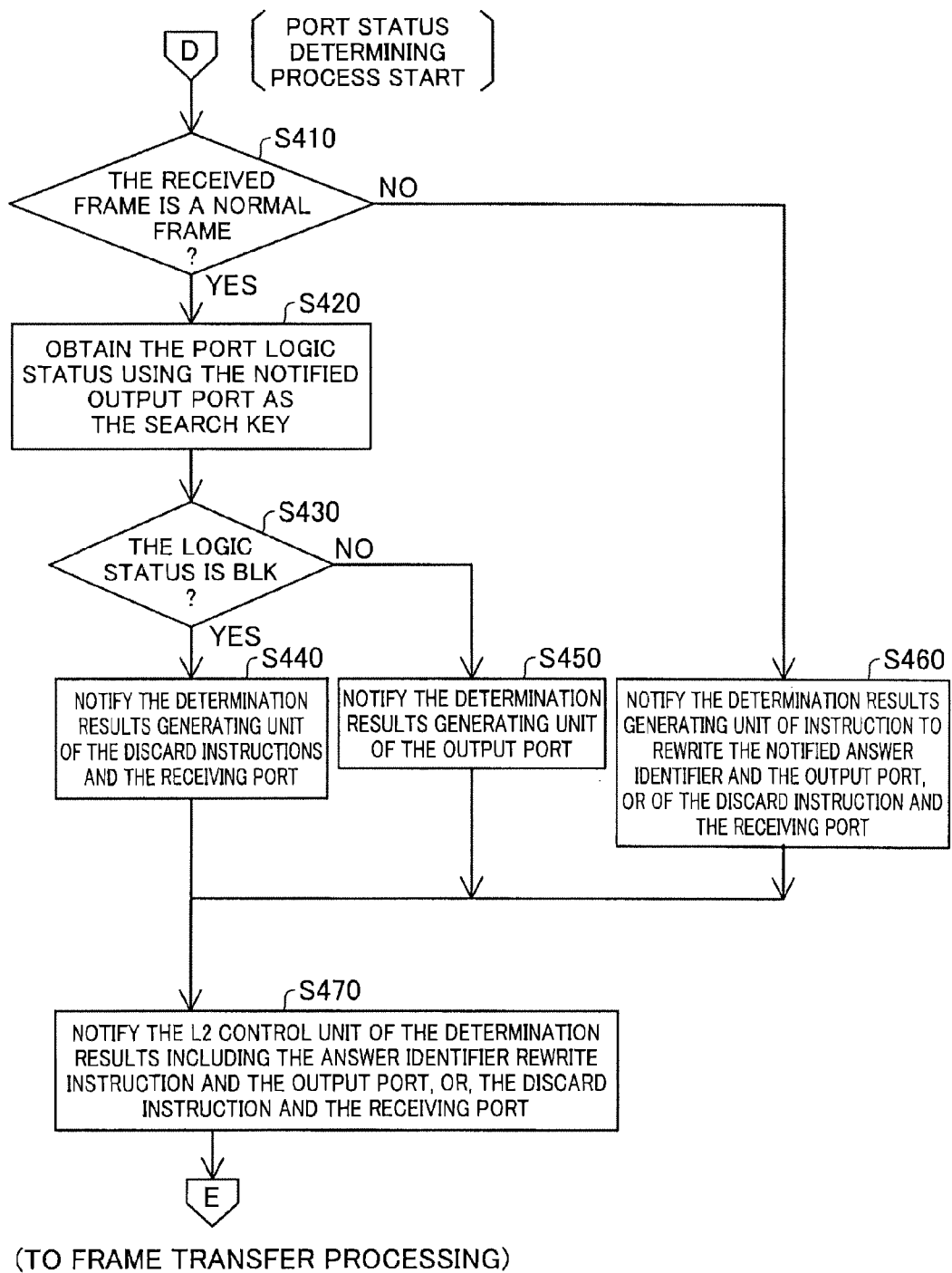

After step S320 is executed, as shown in FIG. 12, the port status determining unit 44d determines whether or not the received frame is a normal frame (step S410). When an LHC frame is received, it is determined that the received frame is not the normal frame (step S410: No). In this case, the port status determining unit 44d notifies the determination results generating unit 46d of the answer identifier rewrite instruction and of the output port notified from the destination search unit 42d, or of the discard instruction and of the receiving port (step S460). As described previously, when an LHC frame is received, the answer identifier and the output port are notified from the destination search unit 42d, so the port status determining unit 44d notifies the determination results generating unit 46d of the answer identifier and the output port. The discard instruction and the receiving port are notified when the received frame is an LHCB frame, as described later.

The determination results generating unit 46d notifies the layer 2 control unit 22d of the determination results of destination including the notified answer identifier rewrite instruction and the output port, or including discard instruction and the received port (step S470). As described previously, when an LHC frame is received, the determination results generating unit 46d notifies the layer 2 control unit 22d of the determination results of destination including the answer identifier rewrite instruction and the output port.

Figure 13:
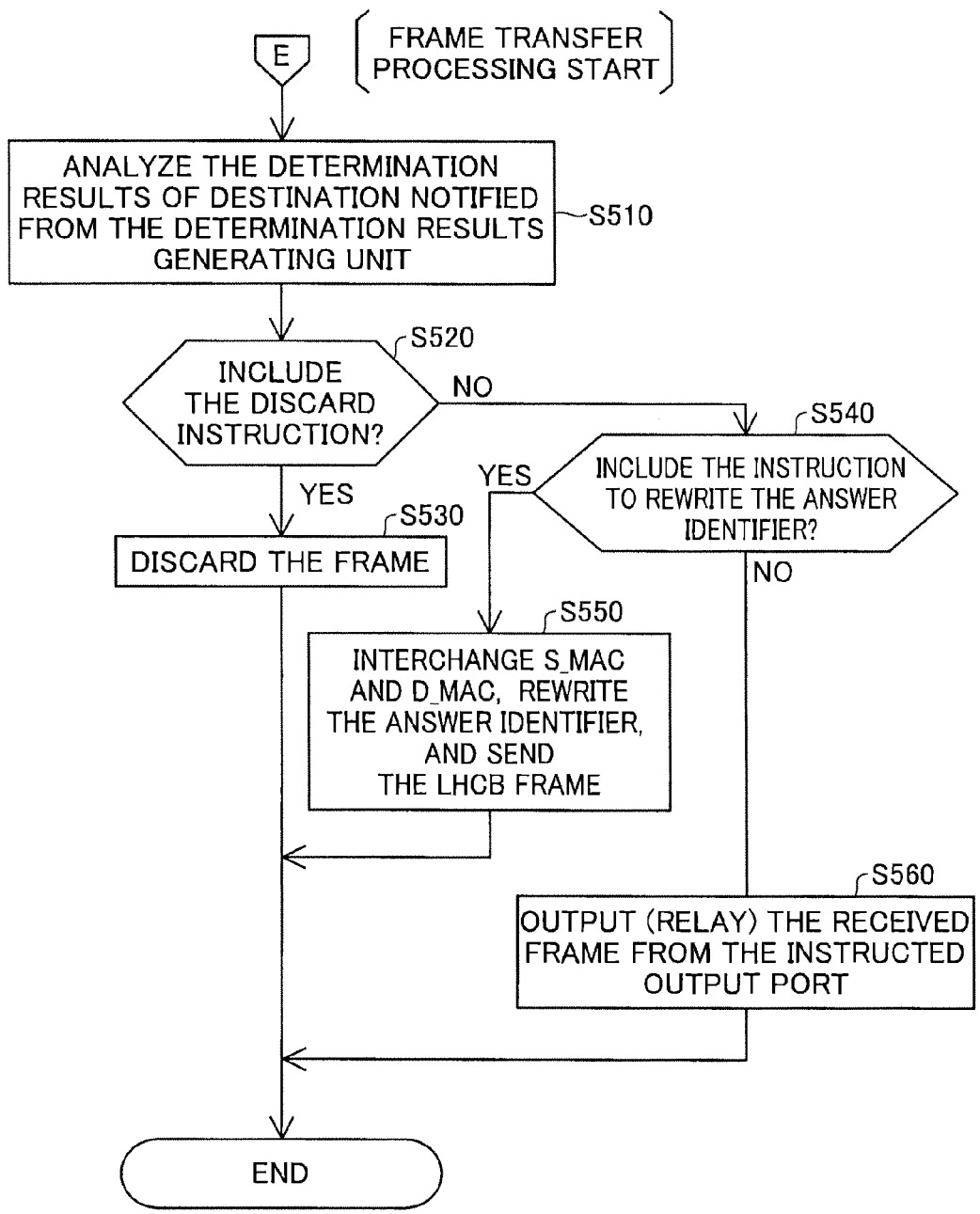

After step S470 is executed, as shown in FIG. 13, the layer 2 control unit 22d analyzes the determination results of destination notified from the determination results generating unit 46d (step S510) and determines whether or not discard instruction is included in the determination results of destination (step S520). As described above, when the received frame is the LHC frame, the received frame does not include discard instruction. In this case (step S520: No), the layer 2 control unit 22d determines whether or not answer identifier rewrite instruction is included in the determination results of destination (step S540).

When the received frame is an LHC frame, answer identifier rewrite instruction is included in the determination results of destination. In this case (step S540: Yes), the layer 2 control unit 22d respectively interchanges the destination MAC address of the received frame to the sending source MAC address, and the sending source MAC address of the received frame to the destination MAC address, and also rewrites the answer identifier to a value indicating the LHCB frame to generate the LHCB frame, and sends the generated LHCB frame via the layer 1 control unit 21d from the instructed output port (step S550).

In specific terms, as shown in FIG. 4, in a state with the LHC frame fc1 stored in the received frame buffer 23d, the layer 2 control unit 22d reads "m4" set for the destination MAC address (D) of the LHC frame fc1, and sets that for the sending source MAC address (S) of the LHCB frame fb1. The layer 2 control unit 22d also reads "m1" set for the sending source MAC address (S) of the LHC frame fc1, and sets that for the destination MAC address (D) of the LHCB frame fb1. The layer 2 control unit 22d also rewrites the "C" (indicating an LHC frame) set for the answer identifier (R) of the LHC frame fc1 to "B" (indicating an LHCB frame) and sets that for the answer identifier of the LHCB frame fb1. For the values of the other fields, the values of the LHC frame fc1 are copied without any modifications and set for the values of the other fields of the LHCB frame fb1. The LHCB frame fb1 generated in this way is output from the port P41 which is the same port as the LHC frame receiving port.

As described above, when the LHC frame is received, the LHCB frame is generated simply by the destination MAC address being interchanged for the sending source MAC address, the sending source MAC address being interchanged for the destination MAC address, and the answer identifier being rewritten, and the generated LHCB frame is output from the LHC frame receiving port (port P41). In this way, an LHCB frame is generated by a simple process of interchanging the values of a portion of the field of the LHC frame or by rewriting them, so this processing can easily be done by hardware processing, making it possible to accelerate processing. With the LHCB frame, the first switch SW1 MAC address is set as the destination MAC address. Therefore, the LHCB frame output from the fourth switch SW4 is relayed to the first switch SW1 by the third switch SW3 and the second switch SW2. As can be understood from the LHC frame receiving flow described above, the fourth switch SW4 does not send the LHCB frame to the first switch SW1 unless the LHC frame is received.

A-2-3-2. LHCB Frame Receiving:

When an LHCB frame sent from the fourth switch SW4 arrives at the first switch SW1, the steps S210 to S230 shown in FIG. 10 described above are executed, and the frame type determining unit 41a determines the frame type based on the destination MAC address and the answer identifier notified from the layer 2 control unit 22a (step S240). With the LHCB frame, the monitoring MAC address is set for the destination MAC address, and a value indicating the LHCB frame is set for the answer identifier. Therefore, at step S240, the received frame is determined to be the LHCB frame.

Figure 14:
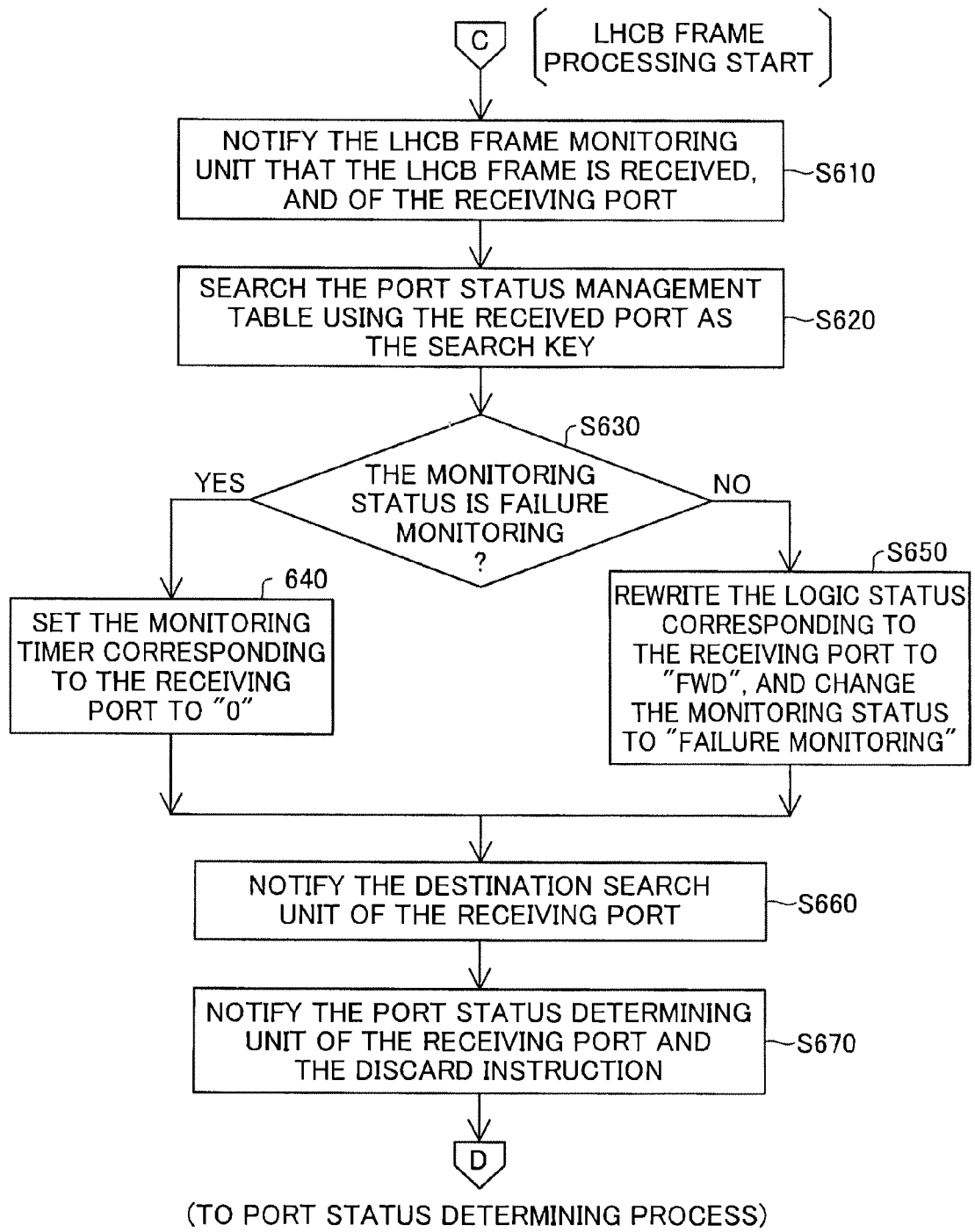

When determined to be the LHCB frame, as shown in FIG. 14, the frame type determining unit 41a notifies the LHCB frame monitoring unit 47a of the fact that the LHCB frame is received and of the receiving port (step S610). The LHCB frame monitoring unit 47a uses the notified receiving port as the search key to search the port status management table 45a (step S620), and determines whether or not the monitoring status of the receiving port is failure monitoring status (step S630).

When the monitoring status is "failure monitoring" (step S630: Yes), the monitoring timer corresponding to the receiving port of the port status management table 45a is set to "0" (clear) (step S640). Meanwhile, when the monitoring status is not "failure monitoring" status (step S630: No), specifically, when the monitoring status is "recovery monitoring" status, the logic status corresponding to the receiving port is rewritten to "FWD (frame send/receive enable), and the monitoring status is rewritten to "failure monitoring" (step S650).

When the first LHCB frame is received, as shown in FIG. 9, the monitoring status for the port P11 is "recovery monitoring" status, so step S650 is executed, the logic status is rewritten to "FWD" and the monitoring status is rewritten to "failure monitoring". Also, when the second LHCB frame is received, or thereafter, the monitoring status is already "failure monitoring", so step S640 is executed and the monitoring timer is reset to "0".

After steps S640 and S650 shown in FIG. 14 are executed, the frame type determining unit 41a notifies the receiving port to the destination search unit 42a (step S660). The destination search unit 42a sends the receiving port and receiving frame discard instruction to the port status determining unit 44a (step S670).

After step S670 is executed, step S410 shown in FIG. 12 is executed. The received frame is the LHCB frame (step S410: No), so after that, step S460 is executed. In contrast to the LHC frame described previously, the port status determining unit 44a is notified of the discard instruction and receiving port from the destination search unit 42a, so at step S460, the port status determining unit 44a notifies the determination results generating unit 46a of the discard instruction and the receiving port.

The determination results generating unit 46a notifies the layer 2 control unit 22a of the determination results of destination including the discard instruction and the receiving port (step S470).

Subsequently, steps S510 and S520 shown in FIG. 13 are executed, and, because the determination results of destination includes the discard instruction, the layer 2 control unit 22a discards the frame (LHCB frame) stored in the received frame buffer (not illustrated, corresponds to the received frame buffer 23d shown in FIG. 4) (step S530).

Figure 15:
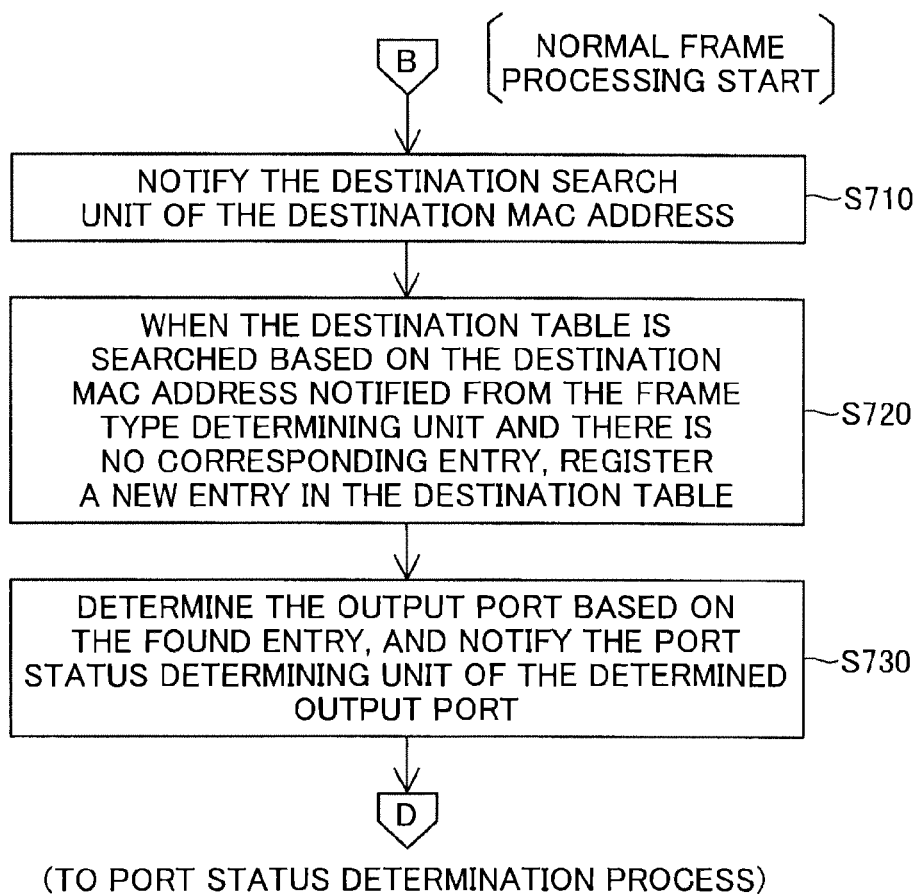

A-2-3-3. Normal Frame Receiving:

When the normal frame arrives at the fourth switch SW4, first, steps S210 to S240 shown in FIG. 10 described above are executed, and the frame type is determined to be the "normal frame". In this case, as shown in FIG. 15, the frame type determining unit 41d notifies the destination search unit 42d of the destination MAC address of the received frame (step S710).

The destination search unit 42d searches the destination table 43d using the notified destination MAC address as the search key (step S720). As a result, when there is no corresponding entry, the destination search unit 42d registers a new entry in the destination table 43d (step S720). This process is typically called the "learning process".

The destination search unit 42d determines an output port for relaying the received frame based on the entry found with step S720 (or a new entry), and notifies the port status determining unit 44d of the determined output port (step S730).

After step S730 is executed, step S410 shown in FIG. 12 is executed. Since the received frame is the normal frame (step S410: Yes), the port status determining unit 44d searches the port status management table 45d using the notified output port as the search key, and obtains the logic status of the output port (step S420). The port status determining unit 44d determines whether or not the output port logic status is BLK (frame send/receive disable) (step S430). When the output port logic status is BLK (step S430: Yes), the port status determining unit 44d notifies the determination results generating unit 46d of the discard instruction and the receiving port (step S440). The same as with the LHCB frame described above, for the processing after notification of the discard information and the receiving port, step S470, and the steps S510, S520, and S530 shown in FIG. 13 are executed in this sequence.

On the other hand, when the logic status of the output port is not BLK, specifically, when it is FWD (step S430: No), the port status determining unit 44d notifies the determination results generating unit 46d of the output port (step S450). At step S470, the determination results generating unit 46d notifies the layer 2 control unit 22d of the determination results including the notified output port. After that, steps S510 and S520 shown in FIG. 13 are executed. At step S520, discard instruction is not included in the determination results, so step S540 is executed. At this step S540, since the determination results do not include the answer identifier rewrite instruction, a frame is sent (relayed) from the instructed output port (step S560). In specific terms, the layer 2 control unit 22d copies the frame stored in the received frame buffer 23d as is to the sent frame buffer 24d, and sends the copied frame from the instructed output port via the layer 1 control unit 21d.

Figures 16, 17:
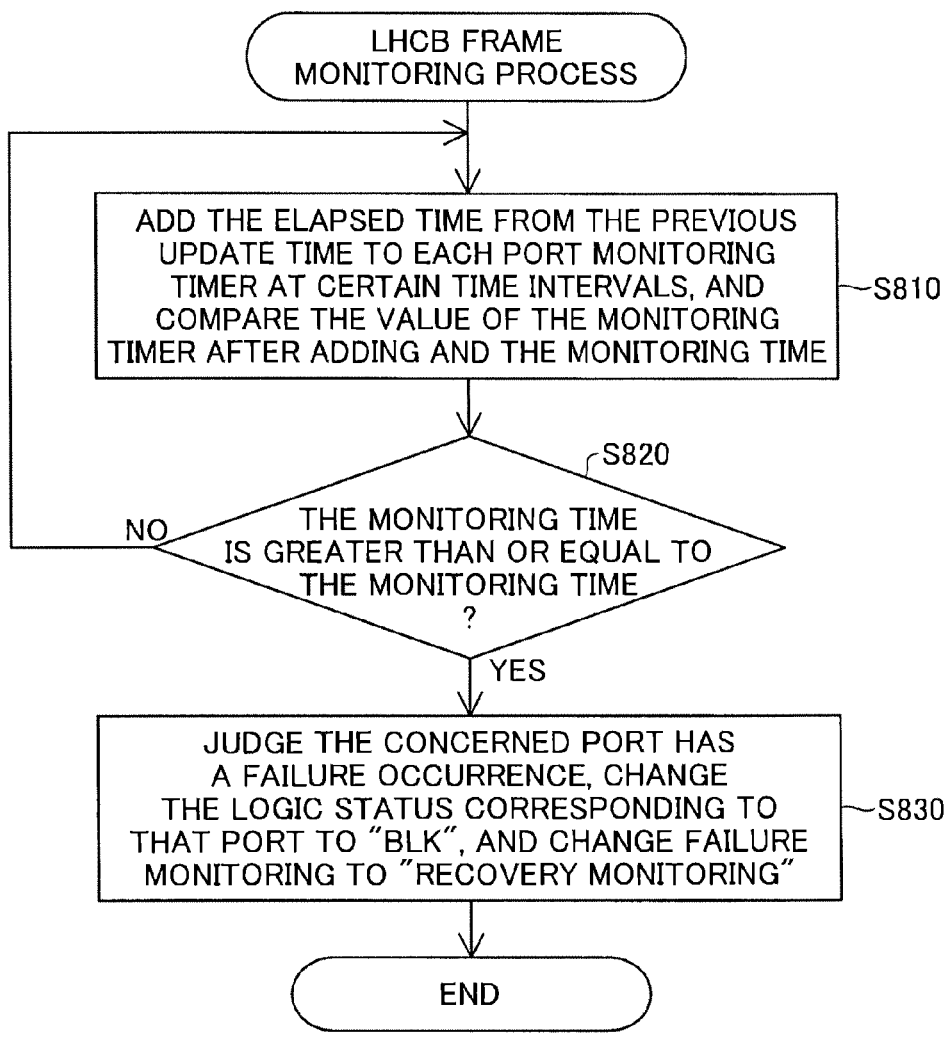
FIG. 16 is a flow chart showing the LHCB frame monitoring processing procedure.
FIG. 17 is an explanatory drawing showing an example of the port status management table in the state when a path failure occurs.

A-2-4. LHCB Frame Monitoring Process:

FIG. 16 is a flow chart showing the procedure of the LHCB frame monitoring process. The LHCB frame monitoring unit 47a of the first switch SW1 instructed to start LHCB frame monitoring starts the LHCB frame monitoring process when the monitoring status of the monitoring subject port changes from "recovery monitoring" to "failure monitoring". As described above, the change in monitoring status can occur when the first LHCB frame is received or the like.

The LHCB monitoring unit 47a adds the elapsed time from the previous update time at certain time intervals to the monitoring timer of the port corresponding to the monitoring subject port of the port status management table 45a and compares the monitoring timer after adding and the monitoring time (step S810). As described previously, when the port P11 is set as the monitoring subject port at the first switch SW1, the value of the monitoring timer field of the entry of the port P11 shown in FIG. 9 increases for each certain time interval from 0 ms. This certain time interval is set to be a shorter time than the monitoring time (with the example of port P11 of FIG. 9, "10 ms").

The LHCB monitoring unit 47a determines whether or not the value of the monitoring timer is the monitoring time or greater (step S820). The LHCB monitoring unit 47a repeats the processing of steps S810 and S820 until the value of the monitoring timer is the monitoring time or greater. Then, when the value of the monitoring timer is the monitoring time or greater (step S820: Yes), the LHCB monitoring unit 47a determines that a failure occurs at the concerned port, and changes the logic status of the monitoring subject port to "BLK" and changes the monitoring status of one to "recovery monitoring" (step S830).

For example, as shown in FIG. 2B, when the physical link L123 is broken and a failure occurs on the path PA12, as described above, the LHC frame does not reach the fourth switch SW4. In this case, the fourth switch SW4 does not send the LHCB frame to the first switch SW1. Therefore, the reset of the monitoring timer set in port P11 (step S640 shown in FIG. 14) is not executed. Accordingly, as a result of repeating the step S810 shown in FIG. 16, the value of the monitoring timer gradually increases and becomes greater than the value of the monitoring timer, and the occurrence of the path failure is detected. In this case, by executing step S830, "frame send/receive disable (BLK)" is set with the monitoring subject port.

FIG. 17 shows an example of a port status management table in a state with a path failure occurring. When a failure occurs on path PA12 as shown in FIG. 2B, as shown in FIG. 17, with the entry of the port P11, the monitoring timer matches the monitoring time and the occurrence of the path failure is detected. As a result, the logic status is rewritten from "FWD" to "BLK", and the monitoring status is rewritten from "failure monitoring" to "recovery monitoring".

In this state, when the path failure is recovered, an LHCB frame again reaches the first switch SW1. As a result, the step 650 shown in FIG. 14 described previously is executed, and with the entry of the port P11, the logic status is rewritten to "FWD" and the monitoring status is rewritten to "failure monitoring".

Figure 18:
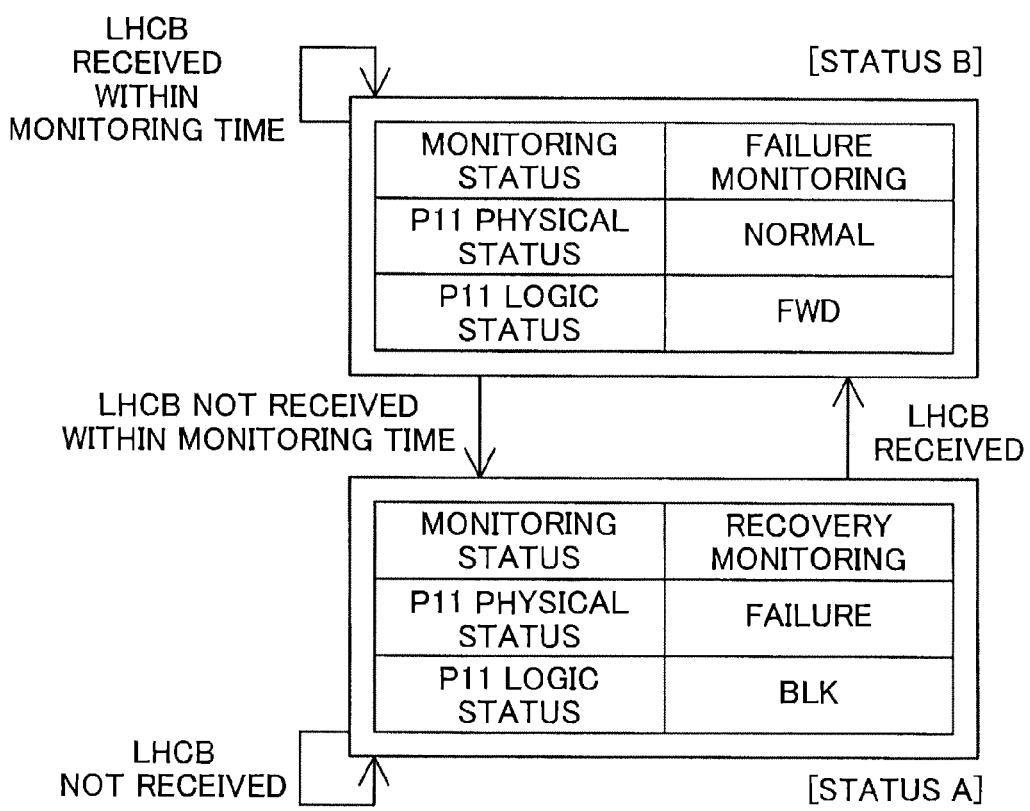
FIG. 18 is an explanatory drawing showing an example of the status transition of the port monitoring status and the logic status with execution of the LHCB frame monitoring process.

FIG. 18 shows an example of the status transition of the port monitoring status and the logic status according to execution of the LHCB frame monitoring process. FIG. 18 shows an example of the status transition of the port P11 that occurs due to the LHCB frame monitoring operation by the LHCB frame monitoring unit 47a of the first switch SW1.

When the LHCB frame is not received at the port P11, a failure occurs on the path PA12 or the path PA21 connected to the port P11, and the physical status of the port P11 is judged to be "failure". At this time, the monitoring status of the port P11 in the port status management table 45a is set to "recovery monitoring" status, and the port P11 logic status is set to "BLK" status, and port P11 becomes "frame send/receive disable". Then, this status (called "status A") is maintained until an LHCB frame is received.

When an LHCB frame is received in a state with the status A being maintained, the physical status of the port P11 is judged to be "normal". At this time, the monitoring status of the port P11 in the port status management table 45a is changed to "failure monitoring" and the logic status of the port P11 is changed to "FWD", and the port P11 is change to "frame send/receive enable". Then, while LHCB frame receiving is being repeated within the monitoring time, this status (called "status B") is maintained.

In a state with status B being maintained, when the LHCB frame is not received within the monitoring time, the status B changes to status A, and the port P11 is changed to "frame send/receive disable".

In this way, by monitoring the receiving of LHCB frames which is an answer to the sent LHC frames, it is possible to automatically change between the status A for which the monitoring status is "recovery monitoring" and the status B for which the monitoring status is "failure monitoring". As a result, it is possible to automatically perform blocking (closing) of a port at the timing when a unidirectional path failure occurs, and recovery of the port at the timing when the failure is eliminated.

As described above, in the network system 100 of this embodiment, at the switch that terminates the monitoring subject path (fourth switch SW4), when an LHC frame is received, the LHCB frame is generated simply by interchanging the destination MAC address and the sending source MAC address, by interchanging the sending source MAC address and the destination MAC address, and by rewriting the answer identifier. Therefore, hardware processing is possible using the layer 2 control unit 22d, and the processing can be accelerated. Accordingly, it is possible to detect the unidirectional path failure between two switches SW1 and SW4 in a short time.

In addition, the LHC frame and the LHCB frame are the same as a normal frame with the L2 header. Therefore, even when the second switch SW2 and the third switch SW3 exist between the first switch SW1 and the fourth switch SW4, it is possible to relay the LHC frame and the LHCB frame at the second switch SW2 and the third switch SW3, in the same as relaying a normal frame. Accordingly, it is possible to monitor the monitoring subject switch via the switch that is not a monitoring subject, and it is possible to monitor the occurrence of path failure in a relatively large scale system.

Also, when an LHCB frame is received within the monitoring time, the first switch SW1 judges that the link is normal, and sets the logic status of the port P11 "frame send/receive enable (FWD)". Meanwhile, when not received within the monitoring time, the first switch SW1 judges that a failure occurs at the link, and sets the logic status of the port P11 "frame send/receive disable (BLK)". With this constitution, it is possible to detect that a path failure occurs at least on one of the path PA12 and the path PA21 connected to the port P11, and also to block sending and receiving of frames by the port P11.

The conventional UDLD uses software for the analysis of various parameters included in the received frame to detect a link failure based on those analysis results, so there is the problem that the failure detection time is long. However, with the path failure detection of this embodiment, it is possible to detect a link failure by determining whether or not the LHCB frame answered the sent LHC frame is received within the monitoring time. It is also possible to easily determine whether or not a received frame is the LHC frame or the LHCB frame based on the destination MAC address. Therefore, it is possible to shorten the path failure detection time compared to the prior art. Accordingly, when a path failure occurs, it is possible to shorten the time required for blocking the corresponding port and for switching the path.

Also, when the path failure is eliminated, the first switch SW1 restarts receiving of the LHCB within the monitoring time. By doing this, the logic status of the port that terminates the path on which the failure occurred is automatically switched from "frame send/receive disable (BLK)" to "frame send/receive enable (FWD)", so it is possible to automatically restart path failure monitoring.

Figure 19:
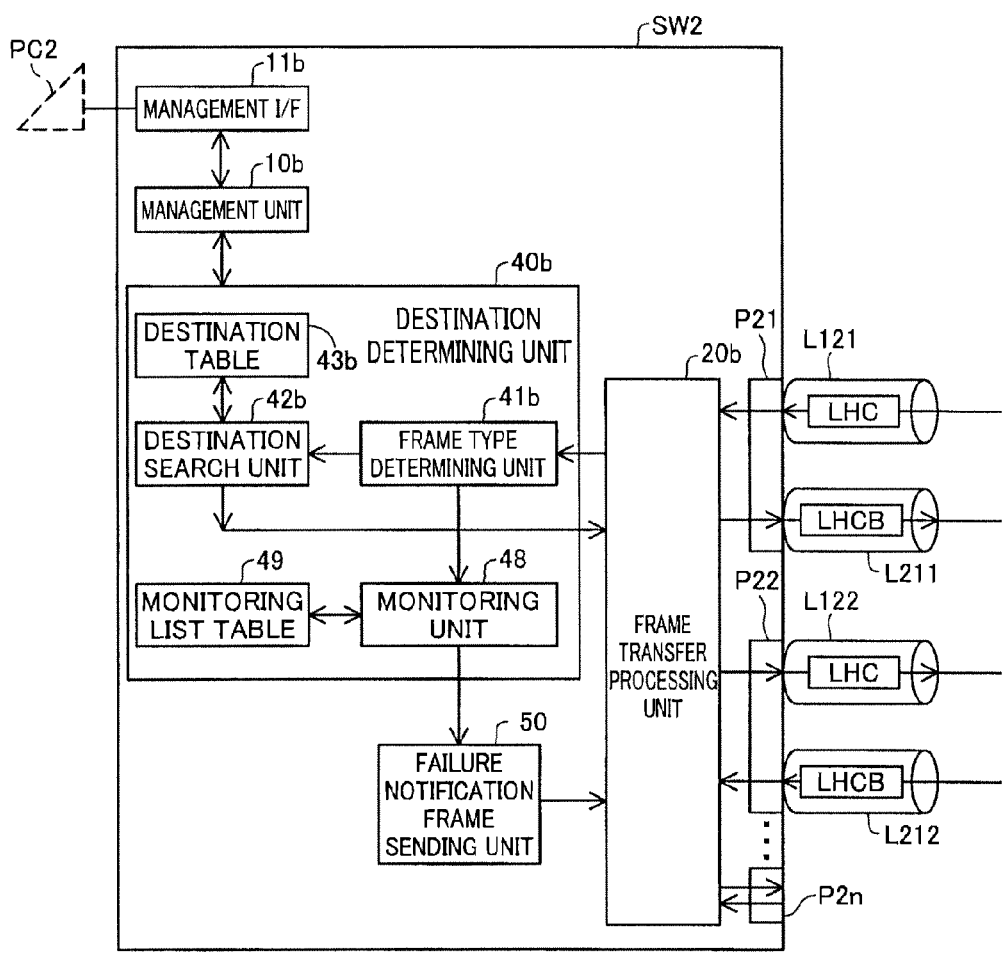
FIG. 19 is an explanatory drawing showing the constitution of the second switch SW2.
Figure 20:
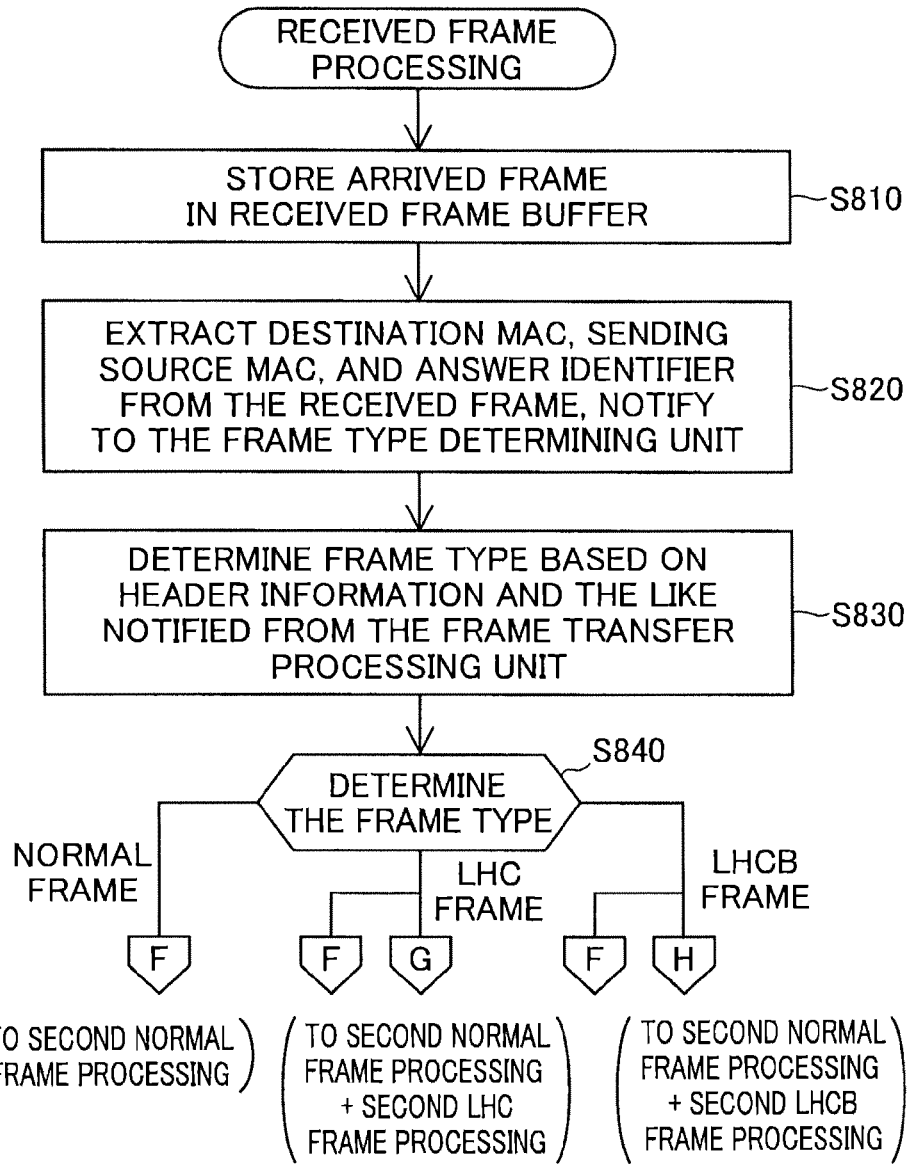
FIG. 20 to FIG. 23 is a flow chart showing the received frame processing procedure.

A-3. Details of Second Switch SW2:

A-3-1. Constitution of Second Switch SW2:

FIG. 19 shows the detailed constitution of the second switch SW2. Of the constitutional elements of the second switch SW2 shown in FIG. 19, for the constitutional elements that are the same as those of the fourth switch SW4 (FIG. 3B), the code numbers given to the fourth switch SW4 constitutional elements are displayed with "d" at the end replaced with "b", and a detailed description is omitted. The second switch SW2 includes a plurality of ports P21, P22, P2n, a frame transfer processing unit 20b, a destination determining unit 40b, a failure notification frame sending unit 50, a management unit 10b, and a management interface 11b.

The port P21 forms physical links L121 and L211 to and from the first switch SW1. The port P22 forms physical links L122 and L212 to and from the third switch SW3. The LHC frame sent by the first switch SW1 is received at the port P21, and is transferred from the port P22 to the third switch SW3 side. Also, the LHCB frame sent by the fourth switch SW4 is received at the port 22, and is transferred from the port 21 to the first switch SW1 side. The frame transfer processing unit 20b basically has the same constitution as the frame transfer processing unit 20d of the fourth switch SW4. However, the frame transfer processing unit 20b does not generate LHCB frames.

The destination determining unit 40b includes a frame type determining unit 41b, a destination table 43b, a destination search unit 42b, a monitoring list table 49, and a monitoring unit 48. The frame type determining unit 41b, the destination table 43b, and the destination search unit 42b have the same constitution as those of the fourth switch SW4. The monitoring list table 49 manages the monitoring actor and the monitoring subject in the network system 100, and also manages the receiving status of LHCB frames as the reply to the transferred LHC frame. The monitoring unit 48 uses the monitoring list table 49 to monitor receiving of LHCB frames as replies to each of the transferred LHC frames. Also, the monitoring unit 48 automatically learns the monitoring actor and the monitoring subject in the network system 100, and records these in the monitoring list table 49.

When an LHCB frame is not received within the specified period, the failure notification frame sending unit 50 generates a failure notification packet, and instructs the frame transfer processing unit 20b to send the generated packet to a specified destination. The monitoring unit 10b and the monitoring interface 11b have the same constitution as those of the fourth switch SW4.

The frame type determining unit 41b described above corresponds to the packet type determining unit in the claims. Similarly, the frame transfer processing unit 20b and the monitoring unit 48 respectively correspond to the transfer processing unit and the monitoring unit in the claims. The monitoring unit 48 corresponds to the learning unit in the claims. Of course, the monitoring unit 48 may have a constitution that the functional unit corresponding to the monitoring unit and the functional unit corresponding to the learning unit are separated. Also, the failure notification frame sending unit 50 and the frame transfer processing unit 20b correspond to the failure notification packet sending unit in the claims.

A-3-2. Received Frame Processing:

The received frame processing with the second switch SW2 is described below. FIG. 20 to FIG. 23 are flow charts showing the procedure of the received frame processing at the second switch SW2. The received frame processing is executed each time a frame is received at any of the ports P21 to P2n of the second switch SW2. When the received frame processing starts at the second switch SW2, the layer 2 control unit 22b stores the arrived frame in the received frame buffer 23b (step S810). The layer 2 control unit 22b extracts the destination MAC address, the sending source MAC address, and the answer identifier from the received frame stored in the received frame buffer 23b, and notifies the frame type determining unit 41b of the extracted information (step S820).

The frame type determining unit 41b determines the frame type based on the destination MAC address and the answer identifier notified from the layer 2 control unit 22b (step S830). The determination method here is the same as that of step S230 noted above. In this embodiment, the m1 and m4 through m6 dedicated to monitoring are registered in advance in the second switch SW2. The frame type determining unit 41b compares this registered MAC address with the destination MAC address to determine the frame type. As a result of determination, if the received frame is the normal frame (step S840: Normal frame), a second normal frame process is executed. Also, if the received frame is the LHC frame (step S840: LHC frame), the second normal frame process and a second LHC frame process are executed in parallel. Also, if the received frame is the LHCB frame (step S840: LHCB frame), the second frame process and a second LHCB frame process are executed in parallel.

Figure 21:
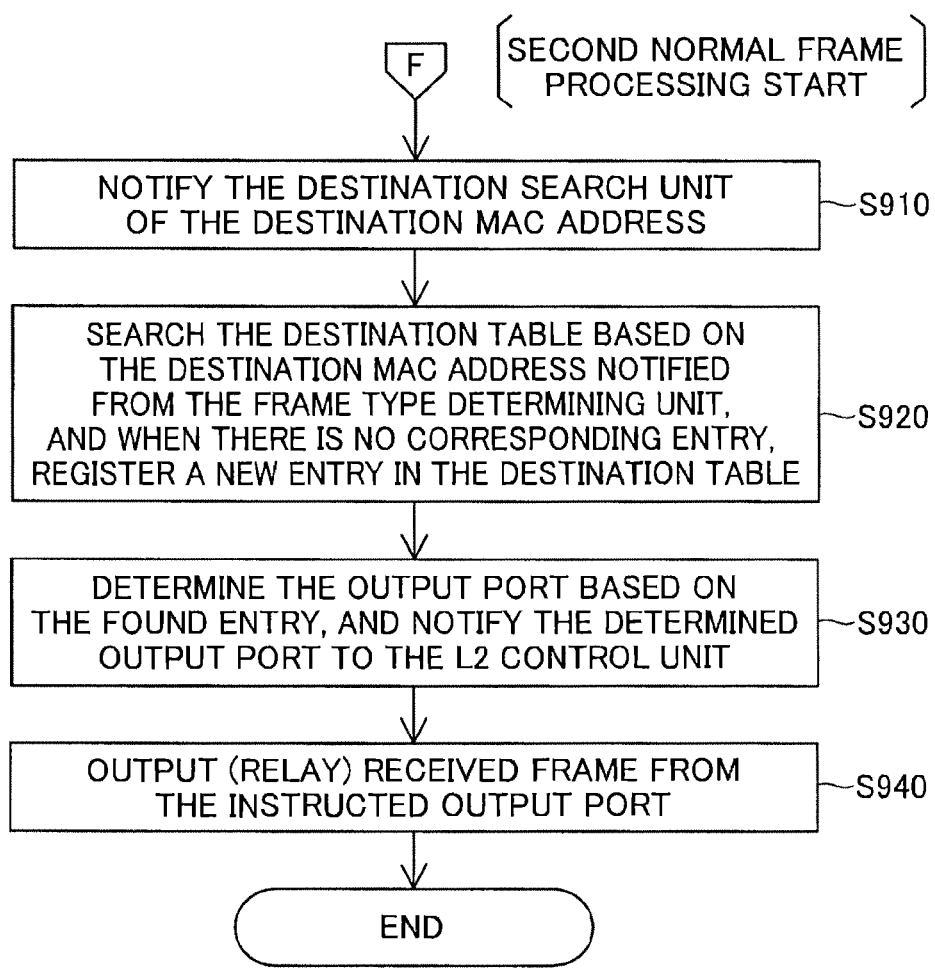

The second normal frame process, the second LHC frame process, and the second LHCB frame process are described below. FIG. 21 shows the second normal frame processing flow. As shown in FIG. 21, with the second normal frame process, the frame type determining unit 41b notifies the destination search unit 42b of the received frame destination MAC address (step S910). The destination search 42b searches the destination table 43b using the notified destination MAC address as a search key (step S920). As a result, when there is no corresponding entry, the destination search 42b registers a new entry in the destination table 43b (step S920).

The destination search unit 42b determines an output port for relaying the received frame based on the entry found by step S920 (or the new entry), and notifies the layer 2 control unit 22b of the frame transfer processing unit 20b of the determined output port (step S930). When the layer 2 control unit 22d receives the output port notification, the layer 2 control unit 22d sends (relays) the frame from the instructed output port (step S940). In specific terms, the layer 2 control unit 22d copies the frame stored in the received frame buffer 23b as is to the sent frame buffer 24b, and sends the copied frame from the instructed output port via the layer control unit 21b. In this way, the second normal frame process ends.

Figure 22:
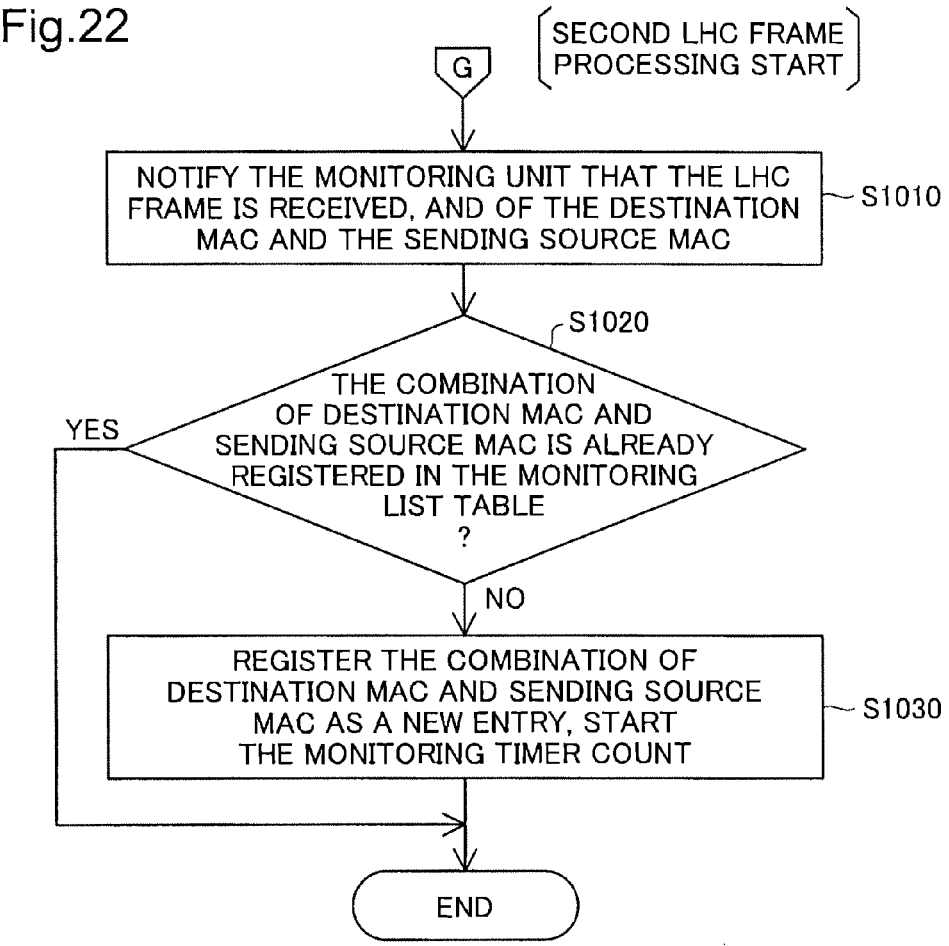

FIG. 22 shows the second LHC frame processing flow. With the second LHC frame process, as shown in FIG. 22, the frame type determining unit 41b notifies the monitoring unit 48 of the fact that an LHC frame is received and of destination MAC address and sending source MAC address of the concerned LHC frame (step S1010). The monitoring unit 48 searches the monitoring list table 49 and judges whether the combination of the notified destination MAC address and the notified sending source MAC address are registered in the monitoring list table 49 (step S1020).

As a result of the judgment, if not already registered (step S1020: No), the monitoring unit 48 registers the combination of the notified destination MAC address and the notified sending source MAC address as a new entry in the monitoring list table 49 (step S1030). In the monitoring list table 49, the sending source MAC address of the LHC frame is registered as the monitoring actor, and the destination MAC address of the LHC frame is registered as the monitoring subject.

A specific example of the monitoring list table 49 is shown in FIG. 24. The monitoring list table 49 is a table for managing the destination to which failure notification frames are sent, described later, by automatic learning. Also, the monitoring list table 49 is used for monitoring the receiving of LHCB frame as reply of the LHC frame transferred by the second switch SW2. As shown in FIG. 24, the monitoring actor MAC address, the monitoring subject MAC address, the monitoring time, and the monitoring timer are correlated and recorded in the monitoring list table 49. With the example in the drawing, as combinations of the monitoring actor MAC address and the monitoring subject MAC address, (m1, m4), (m1, m6), (m5, m4), and (m6, m4) are registered. In other words, the first switch SW1 as the monitoring actor targets the fourth switch SW4 and the sixth switch SW6 as monitoring subjects. Also, the fifth switch SW5 and the sixth switch SW6 as monitoring actors respectively targets the fourth switch SW4 as the monitoring subject.

The monitoring time is a time interval which is the criterion of judging whether path failure occurs. After the LHC frame is transferred, the second switch SW2 judges that a path failure occurs when the LHCB frame corresponding to the LHC frame is not received even after exceeding the monitoring time. As shown in FIG. 19, this monitoring time can be set to a desired value by connecting the management terminal PC2 to the management interface 11*b*. In this embodiment, the monitoring time is set to 8 ms which is shorter than the monitoring time set for the first switch SW1 (10 ms). By doing this, the first switch SW1 is able to detect the failure at the same or faster timing than the LHCB frame monitoring by the first switch SW1 using the failure notification process described later.

The monitoring timer is a measured value of the elapsed time after the LHC frame is transferred by the second switch SW2. In this embodiment, when a new entry is registered at the aforementioned step S1030, the monitoring timer count is started. To measure the elapsed time more precisely, the start of the monitoring timer count and the transfer of the LHC frame may be synchronized.

In this way, when a new entry is registered (step S1030), or if already registered (step S1020: Yes), the second LHC frame processing ends.

Figure 23:
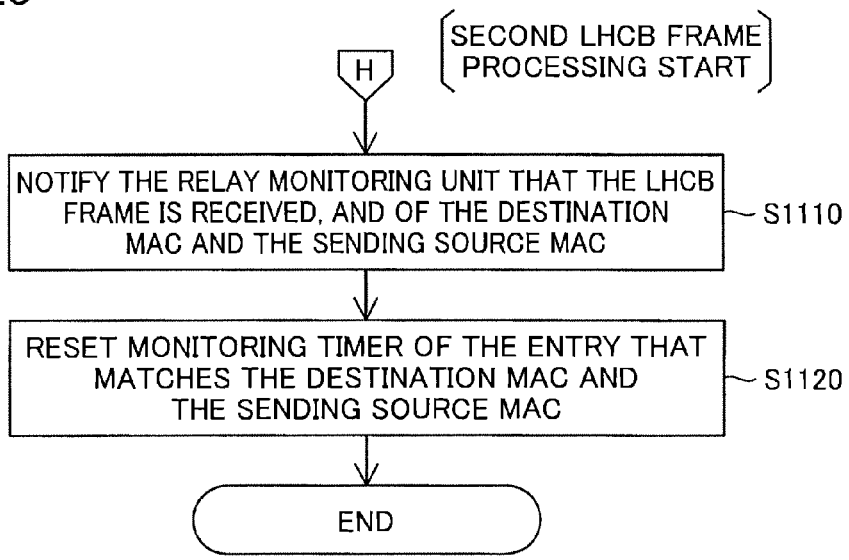

FIG. 23 shows the second LHCB frame processing flow. With the second LHCB frame processing, as shown in FIG. 23, the frame type determining unit 41*b* notifies the monitoring unit 48 of the fact that the LHCB frame is received, and of the LHCB frame's destination MAC address and sending source MAC address (step S1110).

The monitoring unit 48 searches the monitoring list table 49, identifies entry that matches the combination of the notified destination MAC address and the notified sending source MAC address, and resets the monitoring time of the identified entry (step S1120). In this way, the second LHCB frame processing ends.

Figure 25:
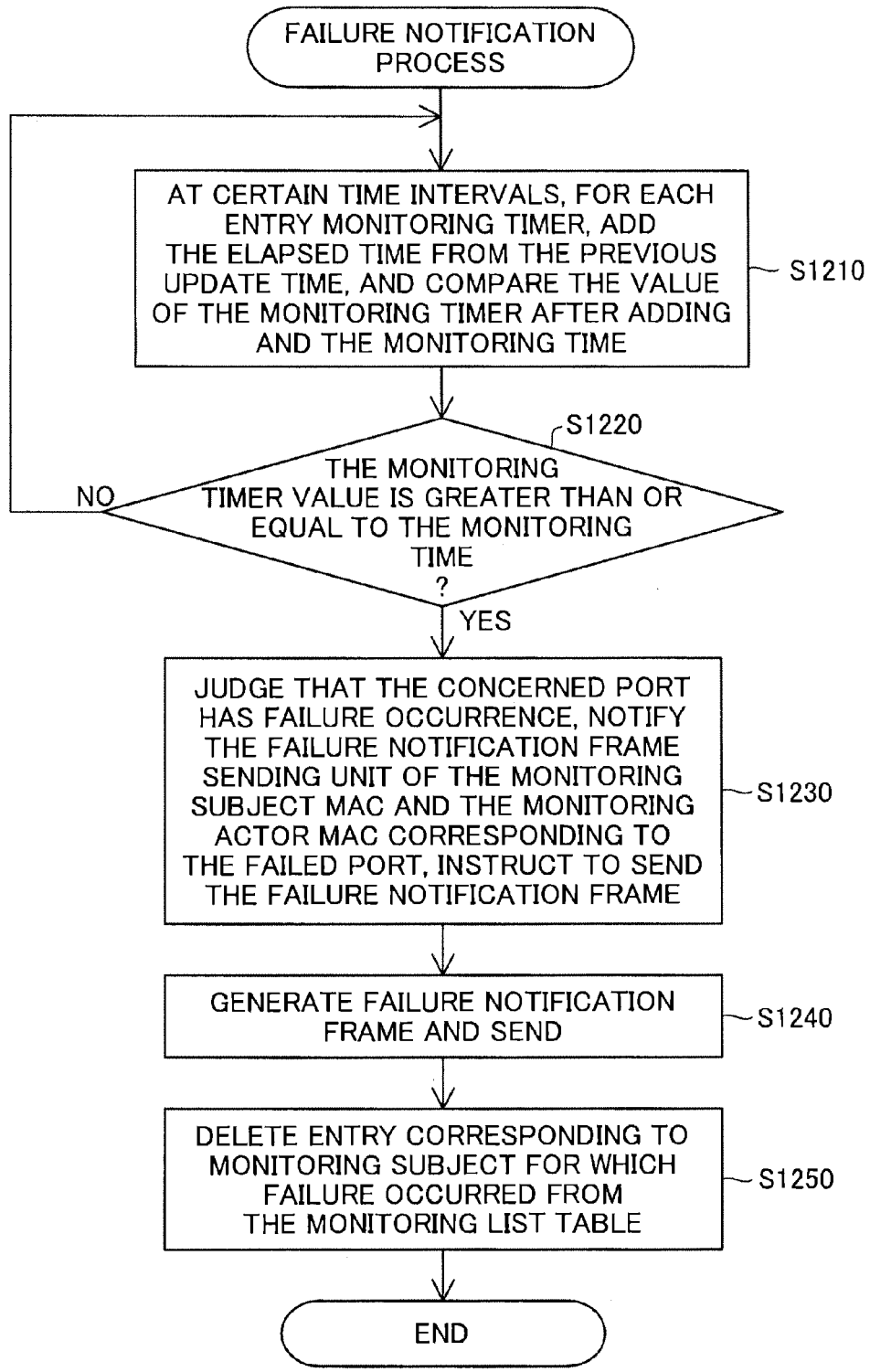
FIG. 25 is a flow chart showing the failure notification processing procedure.

A-3-3. Failure Notification Process:

The failure notification process with the second switch SW2 is described below. The failure notification process is the process of monitoring the receiving of LHCB frames as replies to LHC frames transferred by the switch SW2, and when a failure occurrence is detected, notifying the other communication device of the failure occurrence. FIG. 25 shows the failure notification processing flow. The failure notification process starts when at least one entry is registered in the monitoring list table 49, and after that, is repeatedly executed in parallel with the received frame processing described above.

As shown in FIG. 25, when the failure notification process starts, the monitoring unit 48 adds the elapsed time from the previous update time at certain time intervals to the monitoring timer of each entry of the monitoring list table 49, and compares the monitoring timer after adding with the monitoring time (step S1220). This certain time interval is set to be a time shorter than the monitoring time ("8 ms" with the example in FIG. 24).

The monitoring unit 48 determines whether or not the value of the monitoring timer is the monitoring time or greater (step S1210). The monitoring unit 48 repeats the process of steps S1210 and S1220 until the value of the monitoring timer becomes the monitoring time or greater. Then, when the value of the monitoring timer becomes the monitoring time or greater (step S1220: Yes), the monitoring unit 48 judges that a failure occurs at the port corresponding to the monitoring subject MAC address of the concerned entry. Then, the monitoring unit 48 notifies the failure notification frame sending unit 50 of the monitoring subject MAC address corresponding to the failed port and the monitoring actor MAC address correlated to the monitoring subject MAC address (step S1230). The failure notification frame sending unit 50 instructs the frame transfer processing unit 20*b* to generate a failure notification frame with the notified monitoring actor MAC address as the destination (step S1230). For example, with the example in FIG. 24, when a failure is judged to occur at the port of monitoring subject MAC address "m4", the monitoring unit 48 notifies "m1", "m5", and "m6" correlated to the monitoring subject MAC address "m4" as the monitoring actor MAC addresses.

The frame transfer processing unit 20*b* generates a failure notification frame and sends it in accordance with the instruction received from the failure notification frame sending unit 50 (step S1240). For example, with the example in FIG. 24, when it is judged that a failure occurs at the port of the monitoring subject MAC address "m4", failure notification frames are sent respectively to the first switch SW1, the fifth switch SW5, and the sixth switch SW6.

Figure 26:
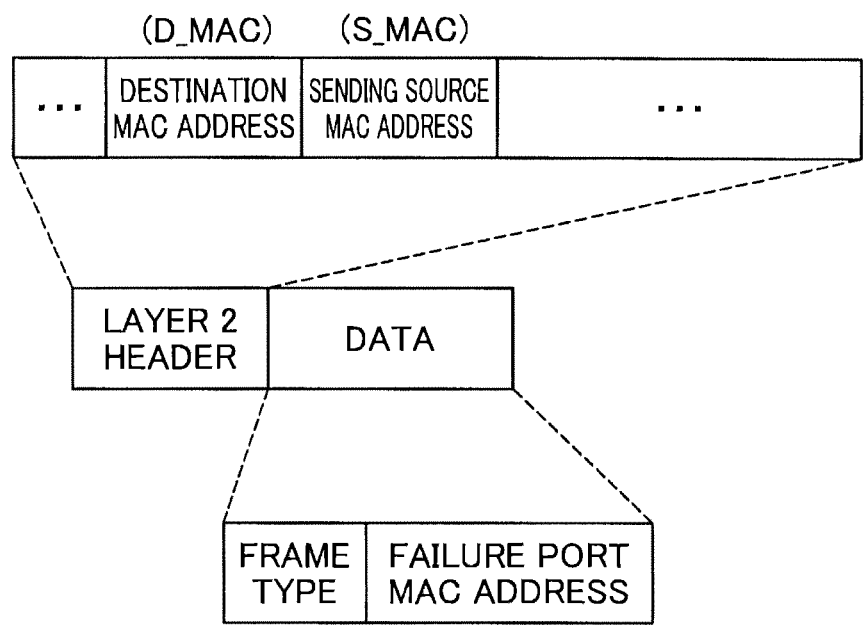
FIG. 26 is an explanatory drawing showing a frame format of the failure notification frame.

In this embodiment, this failure notification frame is generated including the monitoring subject MAC address of the port judged to occur the failure in the payload of the failure notification frame. FIG. 26 shows a specific example of the frame format of the failure notification frame. In this example, the data field is constituted including the frame type, and the MAC address corresponding to the failed port. The frame type is an identifier that indicates the failure notification frame. With the example in FIG. 24, when it is judged that a failure occurs at the port of the monitoring subject MAC address "m4", the MAC address corresponding to the failed port is "m4". The frame type is not essential, and the type field within the layer 2 header may be used for identification of the failure notification frame. Of course, when the failure notification frame is registered in the other communication device in advance and the failure notification frame is sent using the registered MAC address as the sending source address, an identifier is not needed.

Also, the constitution is not limited to notification with the MAC address corresponding to the failed port being included in the payload. For example, a failure notification frame may be generated using the monitoring subject MAC address of the port judged to occur the failure as the sending source MAC address. In this case, an identifier indicating that the sending source MAC address of the failure notification frame corresponds to the port judged to occur the failure may be given to the failure notification frame. If this identifier is given using the type field within the layer 2 header, it is possible for the communication device which received the failure notification frame to detect the path on which the failure occurs based only on the header information.

As with these examples, by including the monitoring subject MAC address of the port judged to occur the failure in the failure notification frame, the communication device which received the failure notification frame is able to easily detect the path on which the failure occurs. The communication device which receives the failure notification frame and detects the failure closes the port for which the detected failure occurs and switches the relay path to another path.

When the failure notification frame is sent in this way, the monitoring unit 48 deletes the entry corresponding to the monitoring subject MAC address of the port judged to occur the failure from the monitoring list table 49 (step S1250). With the example in FIG. 24, when the failure is judged to occur at the port of the monitoring subject MAC address "m4", as combinations of the monitoring entity MAC address and the monitoring subject MAC address, the entries of (m1, m4), (m5, m4), and (m6, m4) are deleted. By doing this, the notification frame that notifies same path failure is not sent a plurality of times to the same monitoring actor communication device. For example, with the example in FIG. 24, after sending the failure notification frame to the first switch SW1, the fifth switch SW5, and the sixth switch SW6 based on the monitoring timer of the entry of (m1, m4) as the combination of the monitoring actor MAC address and the monitoring subject MAC address, the failure notification frame is not sent to the first switch SW1, the fifth switch SW5, and the sixth switch SW6 based on the monitoring timer of the entry of (m5, m4). In this way, the failure notification process ends.

The second switch SW2 of this constitution utilizes the LHC frame and the LHCB frame transmitted between the first switch SW1 and the fourth switch SW4 to notify the first switch SW1, the fifth switch SW5, and the sixth switch SW6, which target the fourth switch SW4 for monitoring, of the unidirectional path failure that occurs between the second switch SW2 and the fourth switch SW4, using the failure notification frame. Therefore, for example at a communication device other than the first switch SW1, in other words, fifth switch SW5 and sixth switch SW6, it is possible to more quickly detect the occurred unidirectional path failure, compared with the monitoring timing based on the LHC frame sent by the fifth switch SW5 and the sixth switch SW6.

Also, the monitoring actor, for example the first switch SW1, is able to detect the failure using two methods, more specifically, the method of monitoring the reply to the LHC frame sent by the switch itself, and the method of receiving the notification from the second switch SW2. As a result, the first switch SW1 is able to detect the path on which the failure occurs in more detail. For example, when the LHCB frame is not received as the reply to the LHC frame sent by the switch itself, and a failure notification frame is also not received, it is possible to detect that the failure occurs between the first switch SW1 and the second switch SW2.

Also, the second switch SW2 records, for each of the received LHC frames, the correlation of the sending source address and the destination address included therein in the monitoring list table 49. Then, the second switch SW2 learns the sending source address which is correlated to the destination address of the LHC frame for which the LHCB frame is not received within the specified time as the destination of the failure notification frame using the monitoring list table 49. Accordingly, the second switch SW2 sends the failure notification frame only to the monitoring actor which targets a communication device correlated to the failure port for monitoring. Therefore, processing is efficient, and it is possible to suppress the failure notification network load. Also, the sending destination of the failure notification frame is automatically learned, so the user does not have to input the sending destination by manual operation. Accordingly, user convenience is improved.

B. Modifications

Modifications such as the following are also possible for the embodiments noted above, for example.

B-1. Modification 1:

In the embodiments described above, the switches SW1 and SW4 to SW6 are reciprocally the monitoring actors and the monitoring subjects, but the monitoring actor and the monitoring subject can also be set as appropriate. The switch having the failure notification function of the second switch SW2 can also be set as appropriate. For example, each of the switches constituting the network system 100 may have all of the monitoring actor function, the monitoring subject function, and the failure notification function.

B-2. Modification 2:

In the embodiments noted above, the second switch SW2 learns the destination of the failure notification frame based on the sending source MAC address and the destination MAC address of the received LHC frame. The destination learning is, however not limited the aspect based on the sending source MAC address and the destination MAC address but may be any aspect based on at least the sending source MAC address of the received LHC frame. For example, the second switch SW2 may record the sending source MAC addresses of the received LHC frames and learn all of those as the destinations of the failure notification frame. In this way, it is possible to learn a specified destination based on only the sending source MAC address, so the constitution is simple. It is also possible for all the monitoring actors to detect failure early.

The destination of the failure notification frame is not limited to one learned automatically. For example, as shown in FIG. 19, it is also possible to connect the management terminal PC2 to the management interface 11b and register the destination in the second switch SW2 by manual operation. Alternatively, the second switch SW2 may send the failure notification frame by broadcast or multicast.

B-3. Modification 3:

In the embodiments described above, the failure path is notified the switches SW1, SW5, and SW6 by including the MAC address of the switch corresponding to the port judged to occur the failure in the failure notification frame. However, the aspect of notifying the failure path is not limited to the embodiments described above. For example, the first switch SW1 as the monitoring actor may send the LHC frame to which the relay path information as far as the fourth switch SW4, which is the monitoring subject, is added. In this case, the second switch SW2 may add the relay path information, which is added to the LHC frame for which an LHCB frame is not received within the specified time, to the failure notification frame. By doing this, the switch that receives the failure notification frame, for example the sixth switch SW6, is able to easily detect the occurrence of failure between the second switch SW2 and the fourth switch SW4 based on the relay path information added to the failure notification frame and on the sending source MAC address of the failure notification frame.

B-4. Modification 4:

In the embodiments described above, the second switch SW2 determines the type of the received frame based on the sending source MAC address, the destination MAC address, and the answer identifier, but the type determination method is not limited to the aspects described above. For example, when an identifier capable of identifying the LHC frame, the LHCB frame, and the normal frame is added to the LHC frame and the LHCB frame, the second switch SW2 may perform the type determination based only on that identifier.

Alternatively, when a dedicated MAC address to the LHC frame and a dedicated MAC address to the LHCB frame are assigned to each switch, the second switch SW2 may perform the type determination based to only on the MAC addresses. The dedicated MAC addresses may also be registered in advance in the switch SW2. Alternatively, one modified procedure may make a sequence rule for values constituting the dedicated MAC address, and store the rule in the second switch SW2. By doing this, even without the user doing manual registration, the second switch SW2 is able to judge whether or not a certain MAC address is the dedicated MAC address based on whether or not the rule is satisfied.

Also, when it is possible to set a VLAN (Virtual LAN) in the network system 100, one modified procedure may respectively set a VLAN for normal frame sending and receiving, a VLAN for LHC frame sending and receiving, and a VLAN for LHCB frame sending and receiving, and determine each frame type based on the VLAN-ID set for the frame.

B-5. Modification 5:

In the embodiments described above, each of the switches SW1 to SW6 is exemplified as a layer 2 switch, but instead of this, a layer 3 switch may be adopted as each of the switches. In this case, the monitoring subject switch can generate the LHCB packet by interchanging layer 3 destination address and the layer 3 sending source address of the LHC packet, and rewriting the answer identifier included in the layer 3 data field. The second switch SW2 can also determine the LHC packet and the LHCB packet based on the layer 3 address, or learn the destination of the failure notification packet based on the layer 3 address.

Also, in the embodiments described above, a constitution of monitoring of the path failure between switches is shown, but the monitoring actor and the monitoring subject are not limited to switches. For example, it is also possible to monitor layer 2 path failure between a server and storage (NAS (Network Attached Storage), for example). With this constitution, each functional unit included in the two switches SW1 and SW4 are arranged in the server and the storage. It is also possible, for example, to monitor layer 2 path failure between a server and a client (a personal computer, for example). In other words, the monitoring actor and the monitoring subject may be arbitrary communication device capable of communicating with each other with layer 2 or layer 3.

The foregoing has described the invention in detail with reference to the illustrative embodiments and modifications. Among the various elements of the above embodiments and modifications, the elements other than those disclosed in the independent claims are additional and supplementary elements and may be omitted or may be combined according to the requirements. The invention is not limited to the above embodiments or modifications, but a multiplicity of other variants and modifications may be made to the embodiments without departing from the scope of the invention. The invention is not limited to the relay device or network system but may be actualized as, for example, a network failure detection method, a relay device failure notification program, and a storage medium in which the program is recorded.

What is claimed is:

1. A relay device for performing relaying of packets with layer 2 or layer 3, the relay device comprising:
    a packet type determining circuit configured to determine:
        (i) whether the packet received by the relay device is a monitoring packet sent by a first communication device, the monitoring packet including the first communication device as a sending source and a second communication device as a sending destination, the first communication device monitoring a network connection state, the second communication device being monitored; and
        (ii) whether the packet received by the relay device is a monitoring response packet sent by the second communication device as the response to the monitoring packet when the second communication device receives the monitoring packet, the monitoring response packet being generated by interchanging a sending source address and a destination address of the monitoring packet;
    a transfer processing circuit configured to receive the monitoring packet and to transfer the received monitoring packet to a destination of the monitoring packet;
    a monitoring circuit configured to monitor receiving of the monitoring response packet corresponding to the transferred monitoring packet within a specified period;
    a learning circuit configured to:
        learn a specified destination to which a failure notification packet is to be sent, based on at least the sending source address included in the received monitoring packet;
        record a correlation of the sending source address and the destination address which are included in the monitoring packet for each of a plurality of received monitoring packets; and
        learn as the specified destination the sending source address corresponding to the destination address of the monitoring packet for which the corresponding monitoring response packet is not received within the specified period, based on the recorded correlations; and
    a failure notification packet sending circuit configured to generate the failure notification packet notifying an occurrence of a communication failure and to send the failure notification packet to the specified destination, when the monitoring response packet is not received within the specified period, the failure notification packet including the destination address of the monitoring packet corresponding to the monitoring response packet not received within the specified period.

2. The relay device according to claim 1, wherein the learning circuit is configured to learn the sending source address included in each of the received monitoring packets as the specified destination.

3. The relay device according to claim 1, wherein the failure notification packet sending circuit is configured to include in a payload of the failure notification packet the destination address of the monitoring packet for which the corresponding monitoring response packet is not received within the specified period.

4. The relay device according to claim 1, wherein the failure notification packet sending circuit is configured to send as the failure notification packet a packet with a specified identifier, the packet including as the sending source address the destination address of the monitoring packet for which the corresponding monitoring response packet is not received within the specified period.

5. The relay device according to claim 1, wherein when relay path information from the first communication device to the second communication device is given to the received monitoring packet, the failure notification packet sending circuit is configured to send the failure notification packet including the relay path information given to the monitoring packet for which the corresponding monitoring response packet is not received within the specified period.

6. The relay device according to claim 1, wherein the packet type determining circuit is configured to perform determination based on an identifier given to the packet received by the relay device.

7. The relay device according to claim 1, wherein when at least one of the sending source address and the destination address which are included in the packet received by the relay device is a specified address, the packet type determining circuit is configured to determine that the received packet is the monitoring packet, or that the received packet is the monitoring response packet.

8. A network system comprising:
- a first communication device configured to monitor a network connection state;
- a second communication device that is monitored; and
- a relay device provided on a communication path between the first communication device and the second communication device,
- the first communication device comprising a monitoring packet sending circuit configured to send a monitoring packet using the relay device, the monitoring packet including the first communication device as a sending source, and the second communication device as a destination,
- the second communication device comprising a monitoring response packet sending circuit configured to receive the monitoring packet using the relay device, and to send a monitoring response packet as a response to the received monitoring packet using the relay device, the monitoring response packet being generated by interchanging a sending source address and a destination address of the monitoring packet and including the first communication device as a destination,
- the relay device comprising:
  - a packet type determining circuit configured to determine (i) whether the packet received by the relay device is the monitoring packet and (ii) whether the received packet is the monitoring response packet;
  - a transfer processing circuit configured to receive the monitoring packet and to transfer the received monitoring packet to a destination of the monitoring packet;
  - a monitoring circuit configured to monitor receiving of the monitoring response packet corresponding to the transferred monitoring packet within a specified period;
- a learning circuit configured to:
  - learn a specified destination to which a failure notification packet is to be sent based on at least the sending source address included in the received monitoring packet;
  - record a correlation of the sending source address and the destination address which are included in the monitoring packet for each of the received monitoring packets: and
  - learn as the specified destination the sending source address corresponding to the destination address of the monitoring packet for which the corresponding monitoring response packet is not received within the specified period based on the recorded correlations; and
- a failure notification packet sending circuit configured to generate the failure notification packet for notifying an occurrence of a communication failure and to send the failure notification packet to the specified destination when the monitoring response packet is not received within the specified period, the failure notification packet including the destination address of the monitoring packet corresponding to the monitoring response packet not received within the specified period.

9. A network failure detection method in a network system including a first communication device that is configured to monitor a network connection state, a second communication device that is monitored, and a relay device provided on a communication path between the first communication device and the second communication device, the method detecting a failure of a network connected between the first communication device and the second communication device, the method comprising:
- a step of the first communication device sending a monitoring packet using the relay device, the monitoring packet including the first communication device as a sending source, and the second communication device as a destination;
- a step of the relay device receiving the monitoring packet and transferring the received monitoring packet to the second communication device;
- a step of the relay device monitoring a receipt of a monitoring response packet within a specified period, the monitoring response packet being sent as the response to the monitoring packet, the monitoring response packet being generated by interchanging a sending source address and a destination address of the monitoring packet when the second communication device receives the monitoring packet;
- a step of the relay device learning a specified destination to which a failure notification packet is to be sent based on at least the sending source address included in the received monitoring packet;
- a step of the relay device recording a correlation of the sending source address and the destination address which are included in the monitoring packet for each of the received monitoring packets; and
- a step of the relay device learning as the specified destination the sending source address corresponding to the destination address of the monitoring packet for which the corresponding monitoring packet is not received within the specified time, based on the recorded correlations; and
- a step of the relay device generating the failure notification packet notifying an occurrence of a communication failure and sending the generated failure notification packet to the specified destination, when the monitoring response packet is not received within the specified period, the failure notification packet including the destination address of the monitoring packet corresponding to the monitoring response packet not received within the specified period;
- a step of a communication device as the specified destination receiving the failure notification packet and detecting the occurrence of the communication failure.

* * * * *